(12) United States Patent
Stefanski et al.

(10) Patent No.: US 10,203,126 B2
(45) Date of Patent: Feb. 12, 2019

(54) ROTATION DETECTION FOR RING-SHAPED USER INPUT MEMBER OF SMART-HOME DEVICE

(71) Applicant: Google LLC, Mountain View, CA (US)

(72) Inventors: John Stefanski, Palo Alto, CA (US); Marcus Albonico, Atherton, CA (US); Eric Daniels, San Francisco, CA (US)

(73) Assignee: Google LLC, Mountain View, CA (US)

( * ) Notice: Subject to any disclaimer, the term of this patent is extended or adjusted under 35 U.S.C. 154(b) by 667 days.

(21) Appl. No.: 14/836,631

(22) Filed: Aug. 26, 2015

(65) Prior Publication Data

US 2017/0059196 A1    Mar. 2, 2017

(51) Int. Cl.

| F24F 11/50 | (2018.01) |
|---|---|
| F24F 11/52 | (2018.01) |
| F24F 11/00 | (2018.01) |
| G05D 23/19 | (2006.01) |
| F24F 11/30 | (2018.01) |

(52) U.S. Cl.
CPC .......... *F24F 11/0086* (2013.01); *F24F 11/30* (2018.01); *G05D 23/1902* (2013.01); *F24F 11/50* (2018.01); *F24F 11/52* (2018.01)

(58) Field of Classification Search
CPC ................................. F24F 11/50; F24F 11/52
USPC .............................. 73/1.41, 514.39; 337/344
See application file for complete search history.

(56) References Cited

U.S. PATENT DOCUMENTS

| 3,891,462 A | 6/1975 | Langkau |
| 3,947,091 A | 3/1976 | Trcka |
| 7,159,790 B2* | 1/2007 | Schwendinger ..... F24F 11/0012 236/1 C |
| 2002/0057152 A1* | 5/2002 | Elferich ................... G05G 1/08 335/220 |
| 2006/0291535 A1 | 12/2006 | Craig et al. |
| 2013/0099009 A1* | 4/2013 | Filson ................ G05D 23/1902 236/1 C |
| 2014/0084165 A1 | 3/2014 | Fadell et al. |
| 2016/0013560 A1 | 1/2016 | Daniels et al. |
| 2016/0305795 A1* | 10/2016 | Eisenbeis ............... G01D 7/007 |

OTHER PUBLICATIONS

U.S. Appl. No. 14/836,595, filed Aug. 26, 2015, Non-Final Office Action dated Jan. 11, 2018, all pages.

* cited by examiner

*Primary Examiner* — Ned Landrum
*Assistant Examiner* — Daniel C Comings
(74) *Attorney, Agent, or Firm* — Kilpatrick Townsend & Stockton LLP

(57) ABSTRACT

According to one embodiment, a thermostat includes a main body, a rotatable input component that is rotatably coupled with the main body, and a rotation detection system that is configured to sense user rotation of the rotatable input component. The rotatable input component is configured to be rotated by a user to enable the user to provide input to the thermostat. The rotation detection system includes a magnetic component that is positioned on an inner surface of the rotatable input component and that is magnetized so as to have a plurality of alternating north and south magnetic regions. The rotation detection system also includes a sensor that is positioned adjacent the magnetic component. The sensor is configured to detect polarity changes as the rotatable input component and magnetic component are rotated relative to the sensor.

17 Claims, 24 Drawing Sheets

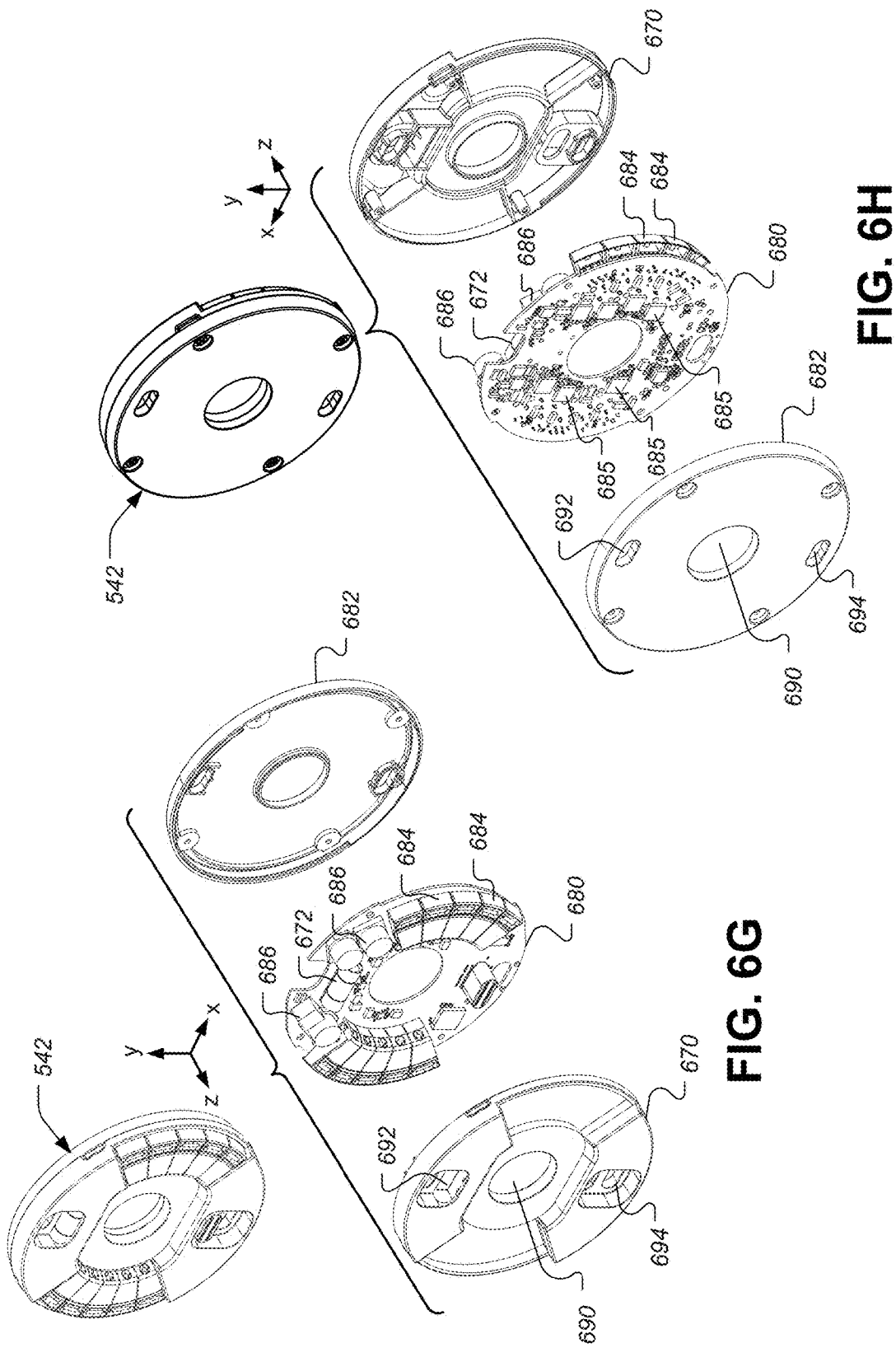

ROTATION DETECTION FOR RING-SHAPED USER INPUT MEMBER OF SMART-HOME DEVICE

BACKGROUND OF THE INVENTION

Thermostats are used in homes, buildings, and other structures to control heating, ventilation, and air conditioning (HVAC) systems to condition one or more rooms within the structure for occupants therein. HVAC systems consume a relatively large amount of energy, especially when these systems are run or operated inefficiently. The use of "smart" devices, such as thermostats, may help reduce the energy consumption of HVAC systems and/or other systems in the structure without sacrificing the comforts that these systems provide. Improvements in smart home devices, such as thermostats, are desired.

BRIEF SUMMARY OF THE INVENTION

Embodiments of the invention provide thermostats that may be used to control a temperature or a room or structure. According to one aspect, a thermostat that is configured for controlling an HVAC system to condition an environment within a building or structure is provided. The thermostat includes a rear member and a front member that is couplable with the rear member. The front member includes a display for displaying information to a user. A rotatable ring is operationally coupled with the front member and rotatable relative thereto. The rotatable ring is configured to be rotated by a user to enable the user to provide input to the thermostat. The thermostat further includes a rotation detection system that is configured to sense user rotation of the rotatable ring. The rotation detection system includes: a strip of magnetic material that is coupled with the inner surface of the rotatable ring so as to wrap circumferentially around the inner periphery of the rotatable ring, a sensor that is positioned adjacent the strip of magnetic material, and a processor that is communicatively coupled with the sensor. The strip of magnetic material is magnetized so as to have a plurality of alternating north and south magnetic regions. The sensor is configured to detect polarity changes in the strip of magnetic material as the strip of magnetic material is rotated relative to the sensor. The processor is configured to determine rotation of the rotatable ring based on polarity change input received from the sensor.

In some embodiments, the strip of magnetic material is coupled with the inner surface of the rotatable ring such that a gap exists between opposing ends of the strip of magnetic material. In such embodiments, the opposing ends of the strip of magnetic material may be angled so that the gap between the opposing ends is also angled. Each of the opposing ends may have the same polarity and one of the opposing ends may have a surface area that is greater than ½ of a surface area of a centrally positioned magnetic pole region. In some embodiments, the sensor is coupled with a circuit board and is positioned on a portion of the circuit board that radially extends toward the strip of magnetic material. The rotatable ring may include a recessed portion on its inner surface and the strip of magnetic material may be disposed in the recessed portion.

According to another aspect, a smart home device may include a main body, a rotatable input component, and a rotation detection system. The main body may include an interior region that houses a plurality of internal components. The rotatable input component may be rotatably coupled with the main body so as to be rotatable relative thereto. The rotatable input component may be configured to be rotated by a user to enable the user to provide input to the smart home device. The rotation detection system may be configured to sense user rotation of the rotatable input component and may include: a magnetic component and a sensor. The magnetic component may be positioned on an inner surface of the rotatable input component and may be magnetized so as to have a plurality of alternating north and south magnetic regions. The sensor may be positioned within the interior region of the main body so as to be adjacent the magnetic component. The sensor may be configured to detect polarity changes as the rotatable input component and magnetic component are rotated relative to the sensor. Rotation of the rotatable input component may be determined based on the sensor sensing polarity changes due to relative movement of the magnetic component.

In some embodiments, a processing unit may be positioned within the interior region of the main body and communicatively coupled with the sensor. The processing unit may be configured to determine a rotation of the rotatable input component based on the polarity change sensed by the sensor. The magnetic component may be positioned on the inner surface of the rotatable input component so as to extend circumferentially around the inner surface of the rotatable input component. A gap may exist between opposing ends of the magnetic component so that the magnetic component does not extend fully around the inner surface of the rotatable input component. The opposing ends of the magnetic component may be angled so that the gap between the opposing ends is also angled.

Each of the alternating north and south magnetic regions between the opposing ends may have a roughly equivalent surface area. A surface area of one of the opposing ends may be greater than ½ of the surface area of a centrally positioned magnetic region. The rotatable input component may include a recessed portion on its inner surface and the magnetic component may be disposed within the recessed portion of the magnetic component. The rotatable input component may be coupled with the main body so as to define an outer periphery of the smart home device and the smart home device may be a thermostat.

According to another aspect, a method of sensing rotation of a rotatable input component of a smart home device is provided. The method includes providing a smart home device that includes: a main body having an interior region that houses a plurality of internal components including a sensor and a processor and a rotatable input component that is rotatably coupled with the main body so as to be rotatable relative thereto. The rotatable input component may include a magnetic component that is positioned on an inner surface of the rotatable input component. The magnetic component may be magnetized so as to have a plurality of alternating north and south magnetic regions. The method may also include detecting, via the sensor, a polarity change as the rotatable input component and magnetic component are rotated relative to the sensor. The method may further include determining, via the processor, rotation of the rotatable input component based on polarity change input received from the sensor.

In some embodiments, the magnetic component may be positioned on the inner surface of the rotatable input component so as to extend circumferentially around the inner surface of the rotatable input component. A gap may exist between opposing ends of the magnetic component such that the magnetic component does not extend fully around the inner surface of the rotatable input component. The opposing ends of the magnetic component may be angled so that the gap between the opposing ends is also angled. The rotatable input component may include a recessed portion on its inner surface and the magnetic component may be disposed within the recessed portion of the magnetic component. The rotatable input component may be coupled with the main body so as to define an outer periphery of the smart home device and the smart home device may be a thermostat.

BRIEF DESCRIPTION OF THE DRAWINGS

The present invention is described in conjunction with the appended figures:

FIGS. 6G-6H illustrate exploded front and rear perspective views, respectively, of a back plate unit with respect to its primary components, according to some embodiments.

Figure 1:
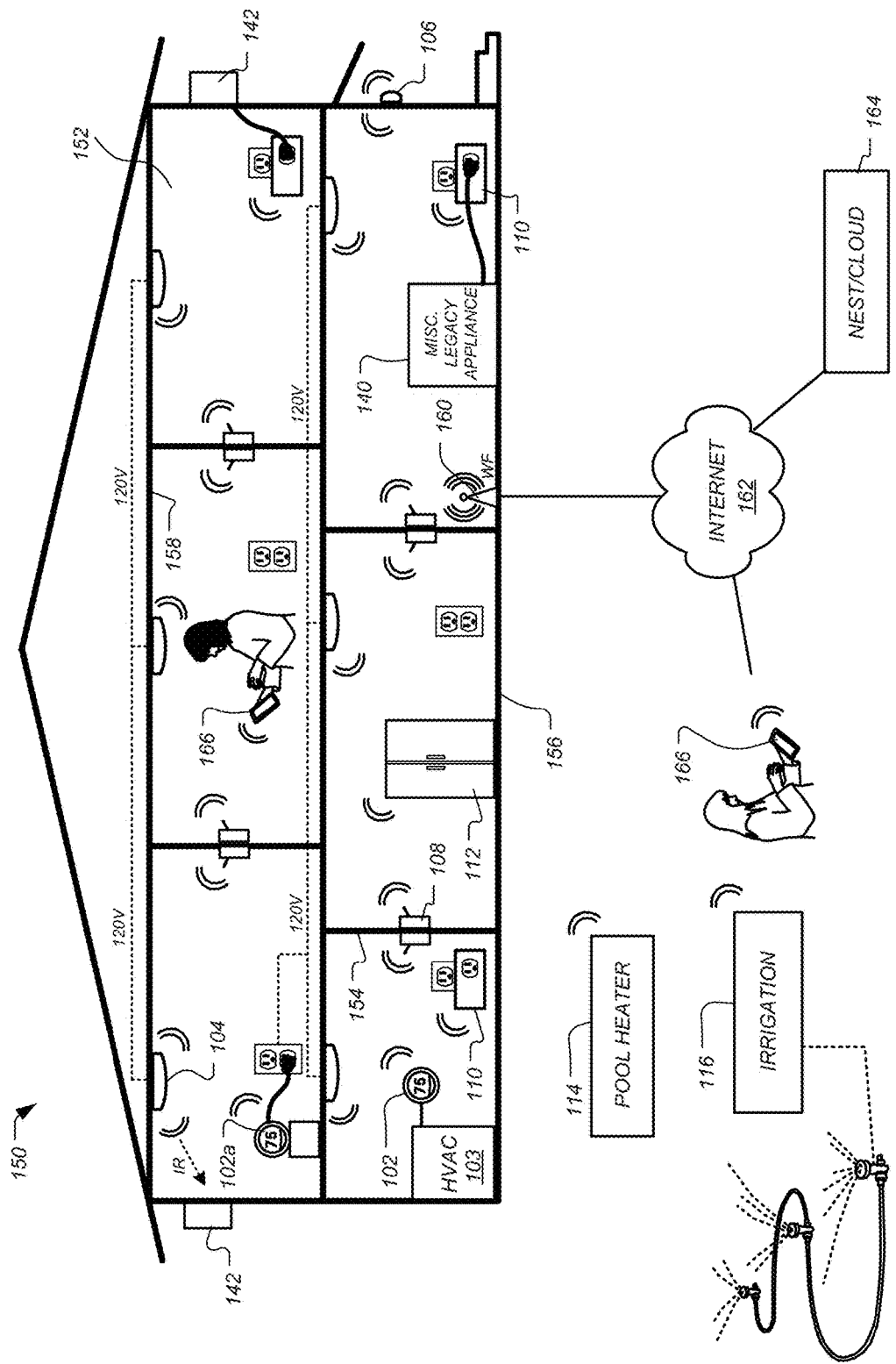
FIG. 1 illustrates an example of a smart home environment within which one or more of the devices, methods, systems, services, and/or computer program products described further herein can be applicable.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The subject matter of this patent specification relates to the subject matter of the following commonly assigned applications, filed on the same day as the present application, each of which is incorporated by reference herein: U.S. patent application Ser. No. 14/836,699, filed on Aug. 26, 2015, titled THERMOSTAT WITH MULTIPLE SENSING SYSTEMS INTEGRATED THEREIN, to Stefanski et al.; U.S. patent application Ser. No. 14/836,648, filed on Aug. 26, 2015, titled THERMOSTAT WITH MULTIPLE SENSING SYSTEMS INCLUDING PRESENCE DETECTION SYSTEMS INTEGRATED THEREIN, to Goyal et al.; U.S. patent application Ser. No. 14/836,568, filed on Aug. 26, 2015, titled AUTOMATED DISPLAY ADJUSTMENTS FOR SMART-HOME DEVICE BASED ON VIEWER LOCATION OR OTHER SENSED VIEWER-RELATED PARAMETERS, to Goyal et al.; U.S. patent application Ser. No. 14/836,744, filed on Aug. 26, 2015, titled SMART THERMOSTAT ROBUST AGAINST ADVERSE EFFECTS FROM INTERNAL HEAT-GENERATING COMPONENTS, to Stefanski et al.; U.S. patent application Ser. No. 14/836,660, filed on Aug. 26, 2015, titled THERMOSTAT ELECTRONIC DISPLAY AND LENSING ELEMENT THEREFOR, to Giustina; U.S. patent application Ser. No. 14/836,631, filed on Aug. 26, 2015, titled ROTATION DETECTION FOR RING-SHAPED USER INPUT MEMBER OF SMART-HOME DEVICE, to Stefanski et al.; U.S. patent application Ser. No. 14/836,595, filed on Aug. 26, 2015, titled USER INTERFACE MEMBER FOR ELECTRONIC DEVICE, to Giustina et al.; U.S. patent application Ser. No. 14/836,323, filed on Aug. 26, 2015, titled INTEGRATED ANTENNA SYSTEM AND RELATED COMPONENTS MANAGEMENT FOR A SMART THERMOSTAT, to Honjo et al. The above-referenced patent applications are collectively referenced herein as "the commonly assigned incorporated applications.

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

According to one aspect of the embodiments described herein a thermostat or other smart home device may include a rotatable input component that is configured for rotation by a user. The rotatable input component may be used by the user to provide input to the thermostat, such as in selecting a menu or other option that is displayed on a display device (e.g., LCD) of the thermostat. Specifically, the user may rotate the rotatable input component to alternate between highlighted menu options that are displayed to the user on the display device. The user may then select a highlighted menu option by providing input to the thermostat, which may include an inward pressing or clicking of the rotatable input component.

The thermostat includes a rotation detection system that employs one or more magnets and magnetic sensors. In a specific embodiment, a magnetic strip of material is positioned on an inner surface of the rotatable input component. The magnetic sensor(s) is positioned adjacent the magnetic strip of material and is configured to detect or sense polarity changes in the magnetic material strip as the rotatable input component and magnetic material strip are rotated relative to the sensor. In some embodiments, the magnetic material strip may be positioned within a recess of the rotatable input component and may have a gap between opposing ends. The opposing ends of the magnetic material strip may be angled so that the gap is likewise angled. The angled gap may aid in masking the gap in the magnetic material strip, such as by being detected by the sensor as a continuous magnetic region. To help ensure that the gap is detected as a continuous magnetic region, the opposing ends may have the same magnetic polarity. The sensor may be disposed within the thermostat and positioned radially outward toward the inner surface of the rotatable input component so as to be adjacent the magnetic material strip.

The Smart-Home Environment

A detailed description of the inventive body of work is provided herein. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

As used herein the term "HVAC" includes systems providing both heating and cooling, heating only, cooling only, as well as systems that provide other occupant comfort and/or conditioning functionality such as humidification, dehumidification and ventilation.

As used herein the terms power "harvesting," "sharing" and "stealing" when referring to HVAC thermostats all refer to thermostats that are designed to derive power from the power transformer through the equipment load without using a direct or common wire source directly from the transformer.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "thermostat" means a device or system for regulating parameters such as temperature and/or humidity within at least a part of an enclosure. The term "thermostat" may include a control unit for a heating and/or cooling system or a component part of a heater or air conditioner. As used herein the term "thermostat" can also refer generally to a versatile sensing and control unit (VSCU unit) that is configured and adapted to provide sophisticated, customized, energy-saving HVAC control functionality while at the same time being visually appealing, non-intimidating, elegant to behold, and delightfully easy to use.

FIG. 1 illustrates an example of a smart home environment within which one or more of the devices, methods, systems, services, and/or computer program products described further herein can be applicable. The depicted smart home environment includes a structure 150, which can include, e.g., a house, office building, garage, or mobile home. It will be appreciated that devices can also be integrated into a smart home environment that does not include an entire structure 150, such as an apartment, condominium, or office space. Further, the smart home environment can control and/or be coupled to devices outside of the actual structure 150. Indeed, several devices in the smart home environment need not physically be within the structure 150 at all. For example, a device controlling a pool heater or irrigation system can be located outside of the structure 150.

The depicted structure 150 includes a plurality of rooms 152, separated at least partly from each other via walls 154. The walls 154 can include interior walls or exterior walls. Each room can further include a floor 156 and a ceiling 158. Devices can be mounted on, integrated with and/or supported by a wall 154, floor or ceiling.

The smart home depicted in FIG. 1 includes a plurality of devices, including intelligent, multi-sensing, network-connected devices that can integrate seamlessly with each other and/or with cloud-based server systems to provide any of a variety of useful smart home objectives. One, more or each of the devices illustrated in the smart home environment and/or in the figure can include one or more sensors, a user interface, a power supply, a communications component, a modularity unit and intelligent software as described herein. Examples of devices are shown in FIG. 1.

An intelligent, multi-sensing, network-connected thermostat 102 can detect ambient climate characteristics (e.g., temperature and/or humidity) and control a heating, ventilation and air-conditioning (HVAC) system 103. One or more intelligent, network-connected, multi-sensing hazard detection units 104 can detect the presence of a hazardous substance and/or a hazardous condition in the home environment (e.g., smoke, fire, or carbon monoxide). One or more intelligent, multi-sensing, network-connected entryway interface devices 106, which can be termed a "smart doorbell", can detect a person's approach to or departure from a location, control audible functionality, announce a person's approach or departure via audio or visual means, or control settings on a security system (e.g., to activate or deactivate the security system).

Each of a plurality of intelligent, multi-sensing, network-connected wall light switches 108 can detect ambient lighting conditions, detect room-occupancy states and control a power and/or dim state of one or more lights. In some instances, light switches 108 can further or alternatively control a power state or speed of a fan, such as a ceiling fan. Each of a plurality of intelligent, multi-sensing, network-connected wall plug interfaces 110 can detect occupancy of a room or enclosure and control supply of power to one or more wall plugs (e.g., such that power is not supplied to the plug if nobody is at home). The smart home may further include a plurality of intelligent, multi-sensing, network-connected appliances 112, such as refrigerators, stoves and/or ovens, televisions, washers, dryers, lights (inside and/or outside the structure 150), stereos, intercom systems, garage-door openers, floor fans, ceiling fans, whole-house fans, wall air conditioners, pool heaters 114, irrigation systems 116, security systems (including security system components such as cameras, motion detectors and window/door sensors), and so forth. While descriptions of FIG. 1 can identify specific sensors and functionalities associated with specific devices, it will be appreciated that any of a variety of sensors and functionalities (such as those described throughout the specification) can be integrated into the device.

In addition to containing processing and sensing capabilities, each of the devices 102, 104, 106, 108, 110, 112, 114 and 116 can be capable of data communications and information sharing with any other of the devices 102, 104, 106, 108, 110, 112, 114 and 116, as well as to any cloud server or any other device that is network-connected anywhere in the world. The devices can send and receive communications via any of a variety of custom or standard wireless protocols (Wi-Fi, ZigBee, 6LoWPAN, Thread, Bluetooth, BLE, HomeKit Accessory Protocol (HAP), Weave, etc.) and/or any of a variety of custom or standard wired protocols (CAT6 Ethernet, HomePlug, etc.). The wall plug interfaces 110 can serve as wireless or wired repeaters, and/or can function as bridges between (i) devices plugged into AC outlets and communicating using Homeplug or other power line protocol, and (ii) devices that not plugged into AC outlets.

For example, a first device can communicate with a second device via a wireless router 160. A device can further communicate with remote devices via a connection to a network, such as the Internet 162. Through the Internet 162, the device can communicate with a central server or a cloud-computing system 164. The central server or cloud-computing system 164 can be associated with a manufacturer, support entity or service provider associated with the device. For one embodiment, a user may be able to contact customer support using a device itself rather than needing to use other communication means such as a telephone or Internet-connected computer. Further, software updates can be automatically sent from the central server or cloud-computing system 164 to devices (e.g., when available, when purchased, or at routine intervals).

By virtue of network connectivity, one or more of the smart-home devices of FIG. 1 can further allow a user to interact with the device even if the user is not proximate to the device. For example, a user can communicate with a device using a computer (e.g., a desktop computer, laptop computer, or tablet) or other portable electronic device (e.g., a smartphone). A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

The smart home also can include a variety of non-communicating legacy appliances 140, such as old conventional washer/dryers, refrigerators, and the like which can be controlled, albeit coarsely (ON/OFF), by virtue of the wall plug interfaces 110. The smart home can further include a variety of partially communicating legacy appliances 142, such as IR-controlled wall air conditioners or other IR-controlled devices, which can be controlled by IR signals provided by the hazard detection units 104 or the light switches 108.

Figure 2:
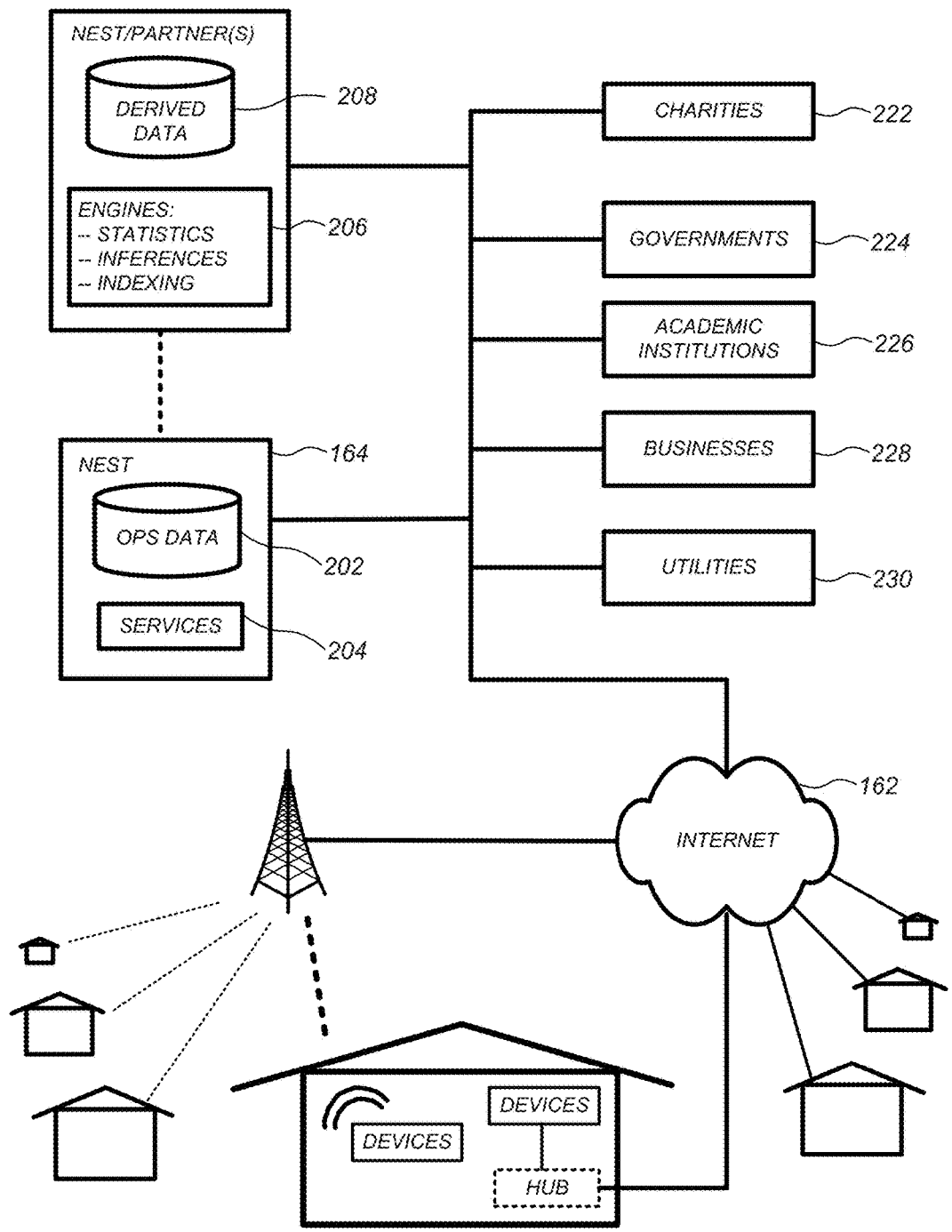
FIG. 2 illustrates a network-level view of an extensible devices and services platform with which the smart home of FIG. 1 can be integrated, according to some embodiments.

FIG. 2 illustrates a network-level view of an extensible devices and services platform with which the smart home of FIG. 1 can be integrated, according to some embodiments. Each of the intelligent, network-connected devices from FIG. 1 can communicate with one or more remote central servers or cloud computing systems 164. The communication can be enabled by establishing connection to the Internet 162 either directly (for example, using 3G/4G connectivity to a wireless carrier), though a hubbed network (which can be scheme ranging from a simple wireless router, for example, up to and including an intelligent, dedicated whole-home control node), or through any combination thereof.

The central server or cloud-computing system 164 can collect operation data 202 from the smart home devices. For example, the devices can routinely transmit operation data or can transmit operation data in specific instances (e.g., when requesting customer support). The central server or cloud-computing architecture 164 can further provide one or more services 204. The services 204 can include, e.g., software update, customer support, sensor data collection/logging, remote access, remote or distributed control, or use suggestions (e.g., based on collected operation data 204 to improve performance, reduce utility cost, etc.). Data associated with the services 204 can be stored at the central server or cloud-computing system 164 and the central server or cloud-computing system 164 can retrieve and transmit the data at an appropriate time (e.g., at regular intervals, upon receiving request from a user, etc.).

One salient feature of the described extensible devices and services platform, as illustrated in FIG. 2, is a processing engines 206, which can be concentrated at a single server or distributed among several different computing entities without limitation. Processing engines 206 can include engines configured to receive data from a set of devices (e.g., via the Internet or a hubbed network), to index the data, to analyze the data and/or to generate statistics based on the analysis or as part of the analysis. The analyzed data can be stored as derived data 208. Results of the analysis or statistics can thereafter be transmitted back to a device providing ops data used to derive the results, to other devices, to a server providing a webpage to a user of the device, or to other non-device entities. For example, use statistics, use statistics relative to use of other devices, use patterns, and/or statistics summarizing sensor readings can be transmitted. The results or statistics can be provided via the Internet 162. In this manner, processing engines 206 can be configured and programmed to derive a variety of useful information from the operational data obtained from the smart home. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engines 206 can generate statistics about device usage across a population of devices and send the statistics to device users, service providers or other entities (e.g., that have requested or may have provided monetary compensation for the statistics). As specific illustrations, statistics can be transmitted to charities 222, governmental entities 224 (e.g., the Food and Drug Administration or the Environmental Protection Agency), academic institutions 226 (e.g., university researchers), businesses 228 (e.g., providing device warranties or service to related equipment), or utility companies 230. These entities can use the data to form programs to reduce energy usage, to preemptively service faulty equipment, to prepare for high service demands, to track past service performance, etc., or to perform any of a variety of beneficial functions or tasks now known or hereinafter developed.

Figure 3:
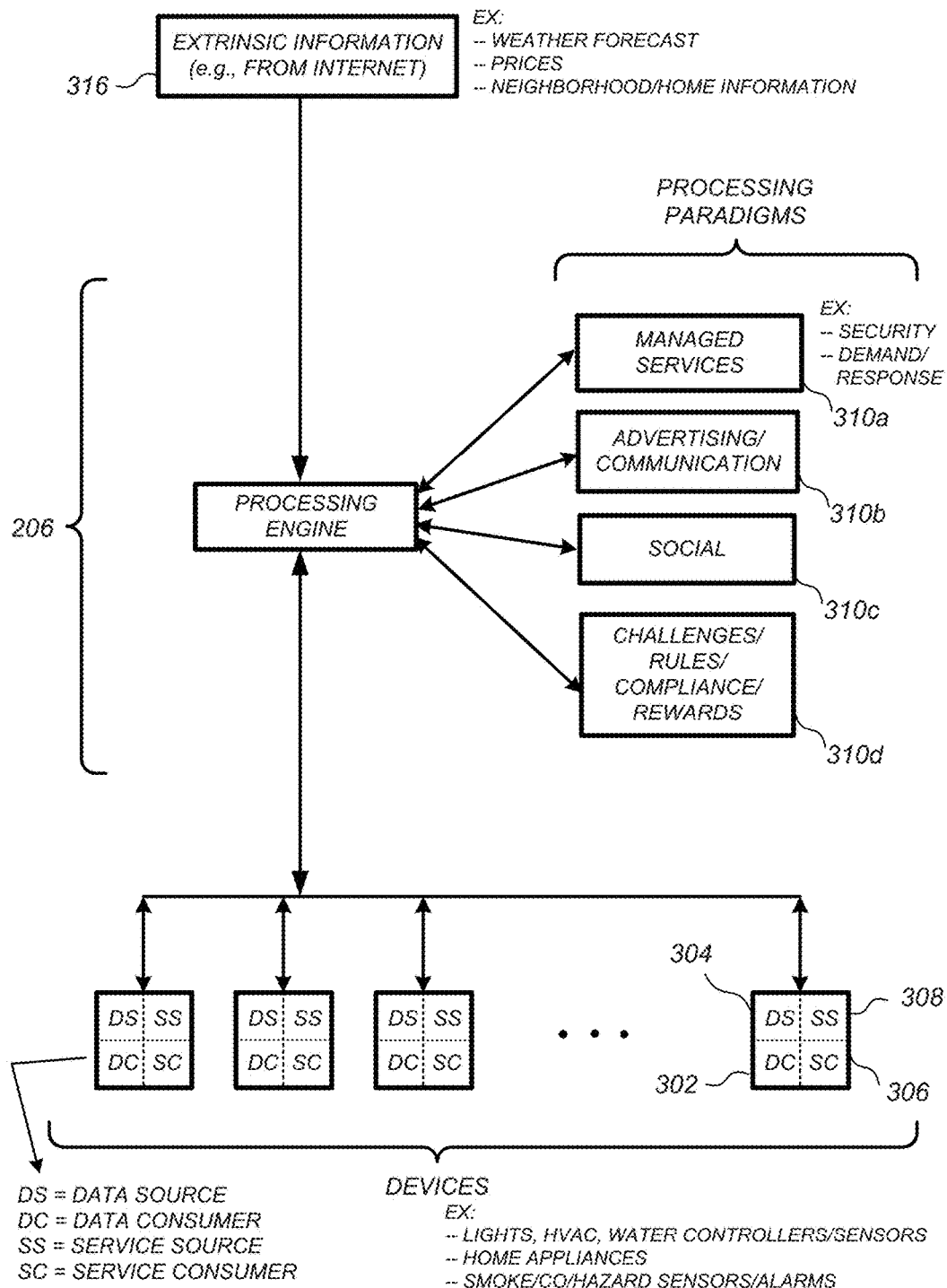
FIG. 3 illustrates an abstracted functional view of the extensible devices and services platform of FIG. 2, according to some embodiments.

FIG. 3 illustrates an abstracted functional view of the extensible devices and services platform of FIG. 2, with particular reference to the processing engine 206 as well as the devices of the smart home. Even though the devices situated in the smart home will have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform can also be configured to harness the large amount of data that is flowing out of these devices. In addition to enhancing or optimizing the actual operation of the devices themselves with respect to their immediate functions, the extensible devices and services platform can also be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 3 shows processing engine 206 as including a number of paradigms 310. Processing engine 206 can include a managed services paradigm 310a that monitors and manages primary or secondary device functions. The device functions can include ensuring proper operation of a device given user inputs, estimating that (e.g., and responding to) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 206 can further include an advertising/communication paradigm 310b that estimates characteristics (e.g., demographic information), desires and/or products of interest of a user based on device usage. Services, promotions, products or upgrades can then be offered or automatically provided to the user. Processing engine 206 can further include a social paradigm 310c that uses information from a social network, provides information to a social network (for example, based on device usage), processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. Processing engine 206 can include a challenges/rules/compliance/rewards paradigm 310d that informs a user of challenges, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc.

Processing engine can integrate or otherwise utilize extrinsic information 316 from extrinsic sources to improve the functioning of one or more processing paradigms. Extrinsic information 316 can be used to interpret operational data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform, ranging from the ordinary to the profound. Thus, in one "ordinary" example, each bedroom of the smart home can be provided with a smoke/fire/CO alarm that includes an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same data bedroom occupancy data that is being used for fire safety can also be "repurposed" by the processing engine 206 in the context of a social paradigm of neighborhood child development and education. Thus, for example, the same bedroom occupancy and motion data discussed in the "ordinary" example can be collected and made available for processing (properly anonymized) in which the sleep patterns of schoolchildren in a particular ZIP code can be identified and tracked. Localized variations in the sleeping patterns of the schoolchildren may be identified and correlated, for example, to different nutrition programs in local schools.

Figure 4:
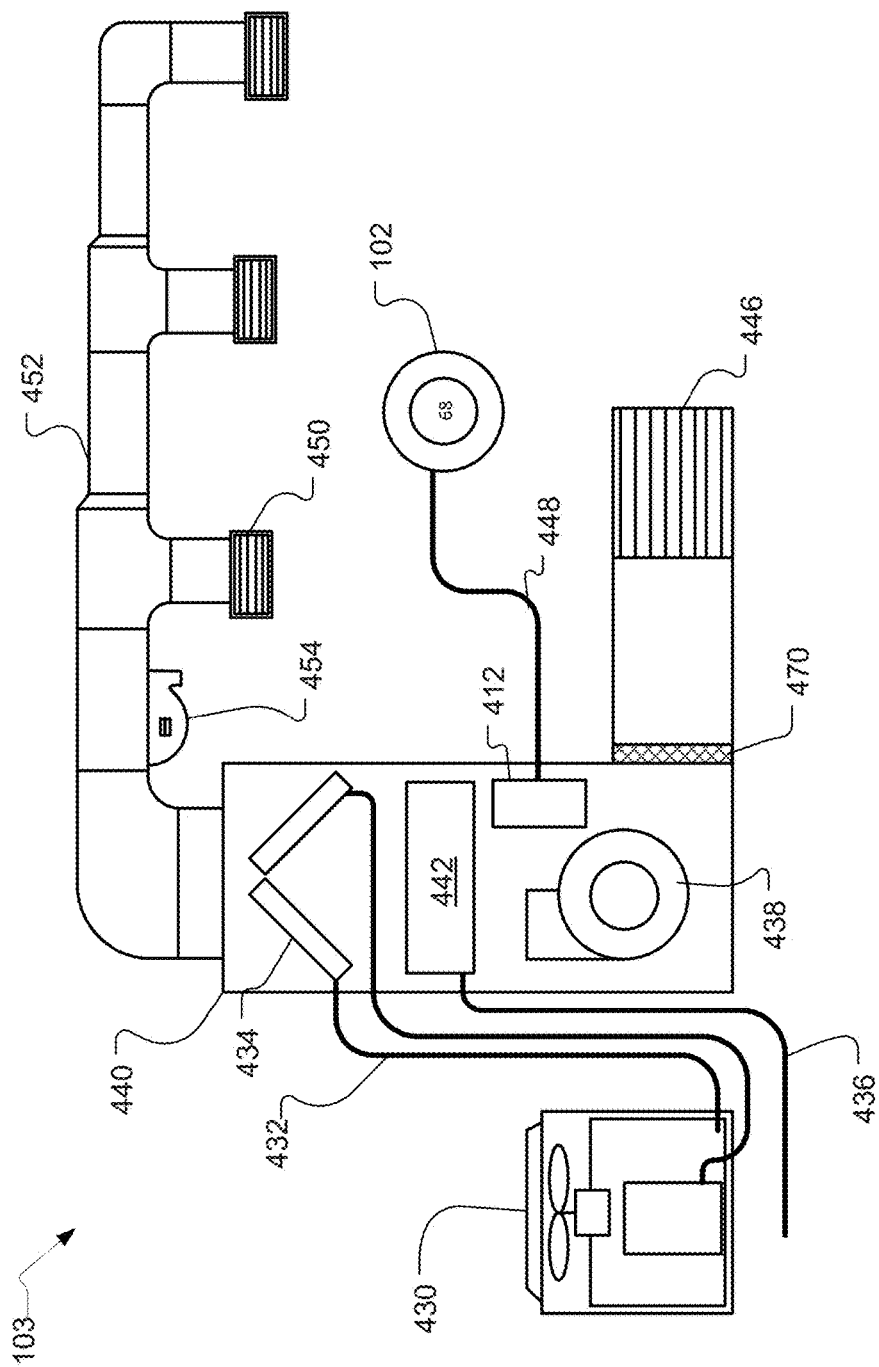
FIG. 4 illustrates a schematic diagram of an HVAC system, according to some embodiments.

FIG. 4 is a schematic diagram of an HVAC system, according to some embodiments. HVAC system 103 provides heating, cooling, ventilation, and/or air handling for an enclosure, such as structure 150 depicted in FIG. 1. System 103 depicts a forced air type heating and cooling system, although according to other embodiments, other types of HVAC systems could be used such as radiant heat based systems, heat-pump based systems, and others.

For carrying out the heating function, heating coils or elements 442 within air handler 440 provide a source of heat using electricity or gas via line 436. Cool air is drawn from the enclosure via return air duct 446 through filter 470, using fan 438 and is heated through heating coils or elements 442. The heated air flows back into the enclosure at one or more locations via supply air duct system 452 and supply air registers such as register 450. In cooling, an outside compressor 430 passes a refrigerant gas through a set of heat exchanger coils and then through an expansion valve. The gas then goes through line 432 to the cooling coils or evaporator coils 434 in the air handler 440 where it expands, cools and cools the air being circulated via fan 438. A humidifier 454 may optionally be included in various embodiments that returns moisture to the air before it passes through duct system 452. Although not shown in FIG. 4, alternate embodiments of HVAC system 103 may have other functionality such as venting air to and from the outside, one or more dampers to control airflow within the duct system 452 and an emergency heating unit. Overall operation of HVAC system 103 is selectively actuated by control electronics 412 communicating with thermostat 102 over control wires 448.

The Smart-Home Thermostat

Figure 5A:
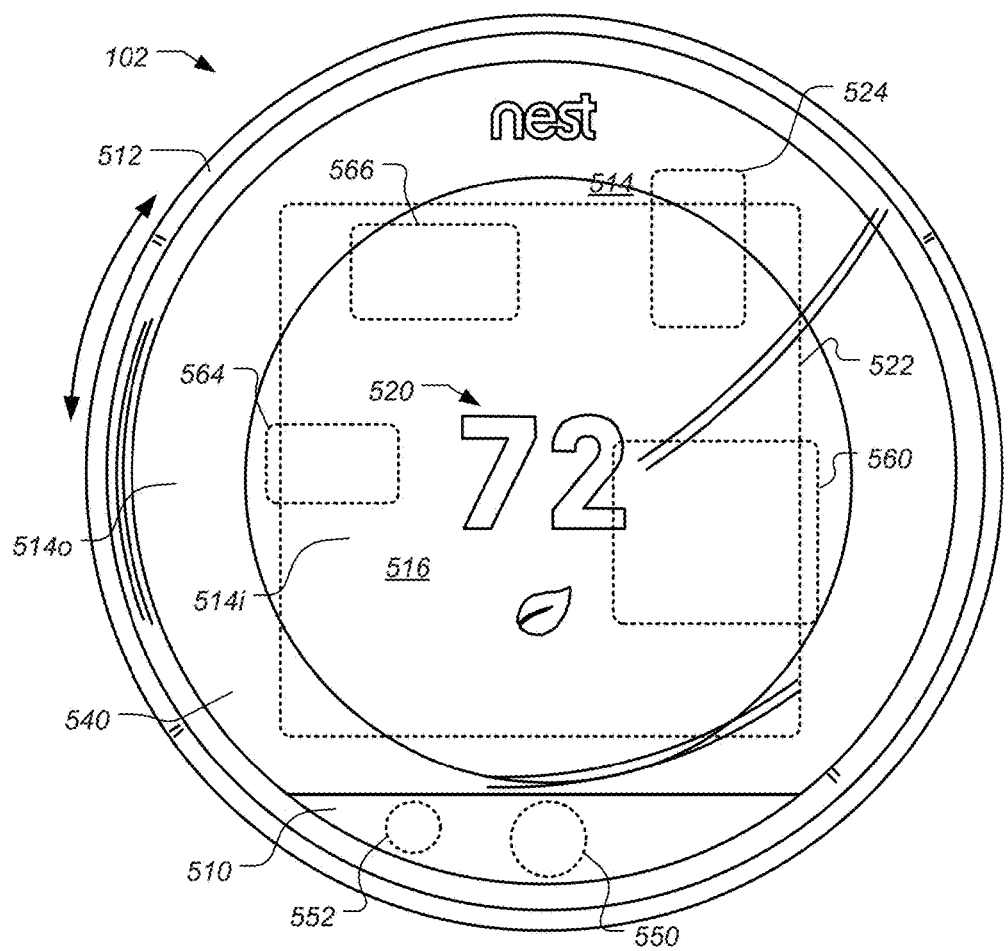
FIGS. 5A-5D illustrate a thermostat having a visually pleasing, smooth, sleek and rounded exterior appearance while at the same time including one or more sensors for detecting occupancy and/or users, according to some embodiments.
Figure 5B:
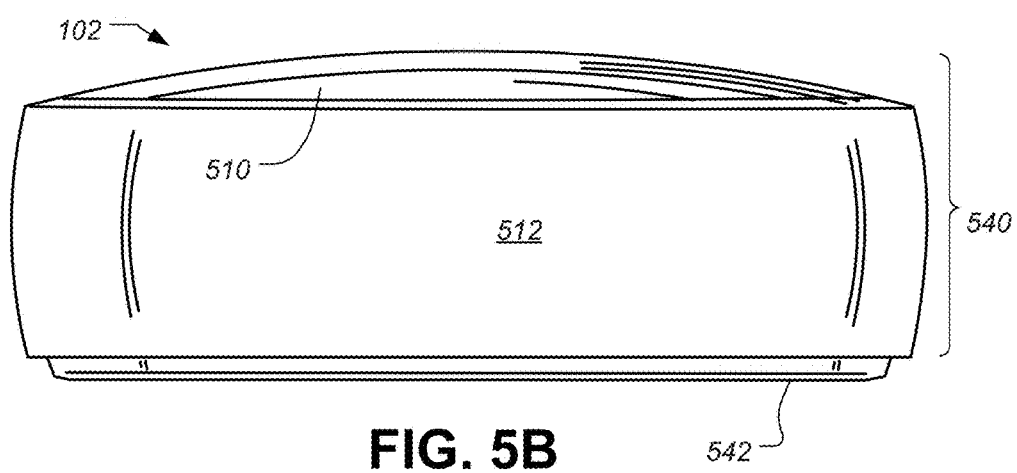
Figure 5C:
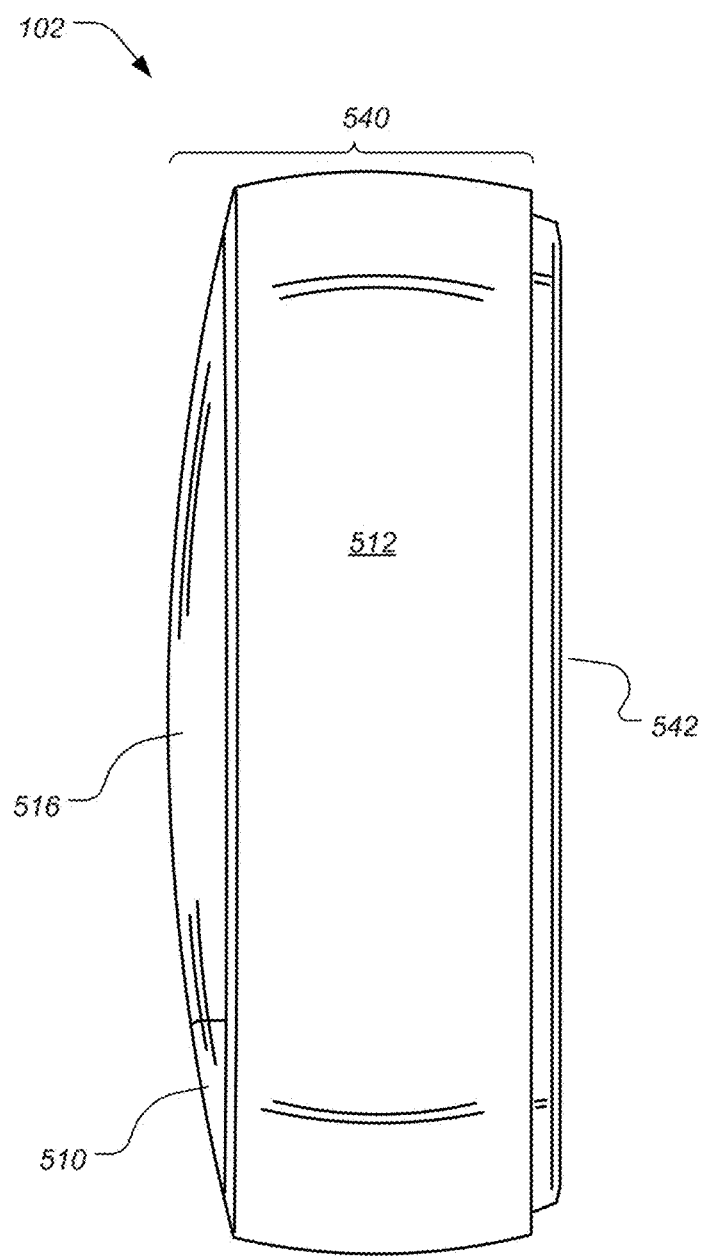
Figure 5D:
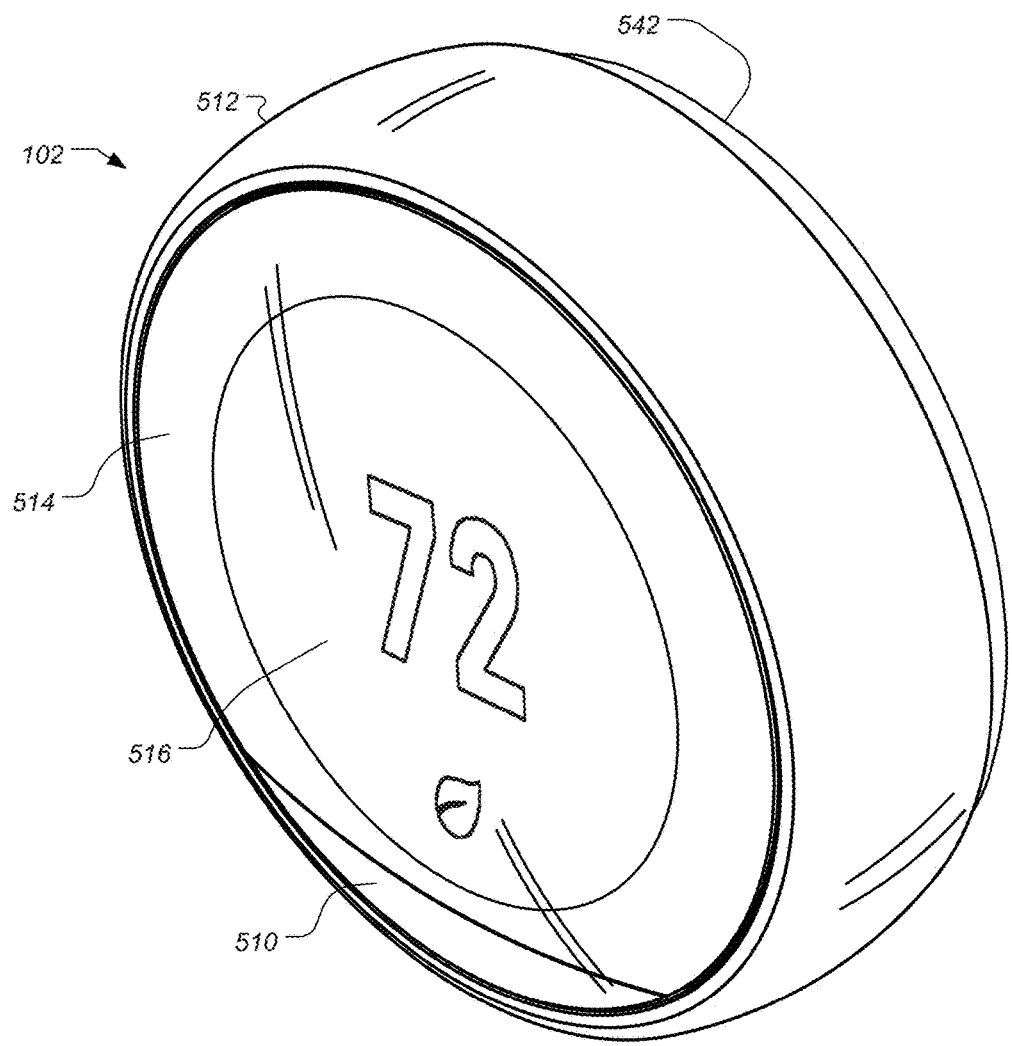

FIGS. 5A-5D illustrate a thermostat having a rounded exterior appearance and including one or more sensors for detecting environmental conditions, such as occupancy and/or users, temperature, ambient light, humidity, and so forth. FIG. 5A is front view, FIG. 5B is a bottom elevation, FIG. 5C is a right side elevation, and FIG. 5D is perspective view of thermostat 102. Unlike many prior art thermostats, thermostat 102 has a simple and elegant design. Moreover, user interaction with thermostat 102 is facilitated and greatly enhanced over known conventional thermostats. The thermostat 102 includes control circuitry and is electrically connected to an HVAC system 103, such as is shown in FIGS. 1-4. Thermostat 102 is wall mountable, is circular in shape, and has an outer rotatable ring 512 for receiving user input. Thermostat 102 has a large convex rounded front face lying inside the outer rotatable ring 512. According to some embodiments, thermostat 102 is approximately 84 mm in diameter and protrudes from the wall, when wall mounted, by 30 mm. The outer rotatable ring 512 allows the user to make adjustments, such as selecting a new setpoint temperature. For example, by rotating the outer ring 512 clockwise, the real-time (i.e. currently active) setpoint temperature can be increased, and by rotating the outer ring 512 counter-clockwise, the real-time setpoint temperature can be decreased.

The front face of the thermostat 102 comprises a cover 514 that according to some embodiments is polycarbonate, and a lens 510 having an outer shape that matches the contours of the curved outer front face of the thermostat 102. According to some embodiments, Fresnel lens elements may are formed on the interior surface of the lens 510 such that they are not obviously visible by viewing the exterior of the thermostat 102. Behind the lens 510 is a passive infrared (PIR) sensor 550 for detecting occupancy, a temperature sensor that is thermally coupled to the lens 510, and a multi-channel thermopile for detecting occupancy, user approaches, and motion signatures. The Fresnel lens elements of the lens 510 are made from a high-density polyethylene (HDPE) that has an infrared transmission range appropriate for sensitivity to human bodies. The lens 510 may also include thin sections that allow a near-field proximity sensor 552, such as a multi-channel thermopile, and a temperature sensor to "see-through" the lens 510 with minimal interference from the polyethylene. As shown in FIGS. 5A-5D, the front edge of the outer rotatable ring 512, cover 514, and lens 510 are shaped such that they together form an integrated convex rounded front face that has a common outward arc or spherical shape arcing outward.

Although being formed from a single lens-like piece of material such as polycarbonate, the cover 514 has two different regions or portions including an outer portion 514o and a central portion 514i. According to some embodiments, the cover 514 is darkened around the outer portion 514o, but leaves the central portion 514i visibly clear so as to facilitate viewing of an electronic display 516 disposed underneath. According to some embodiments, the cover 514 acts as a lens that tends to magnify the information being displayed in electronic display 516 to users. According to some embodiments the central electronic display 516 is a dot-matrix layout (i.e. individually addressable) such that arbitrary shapes can be generated. According to some embodiments, electronic display 516 is a backlit, color liquid crystal display (LCD). An example of information displayed on the electronic display 516 is illustrated in FIG. 5A, and includes central numerals 520 that are representative of a current setpoint temperature. The thermostat 102 may be constructed such that the electronic display 516 is at a fixed orientation and does not rotate with the outer rotatable ring 512. For some embodiments, the cover 514 and lens 510 also remain at a fixed orientation and do not rotate with the outer ring 512. In alternative embodiments, the cover 514 and/or the lens 510 can rotate with the outer rotatable ring 512. According to one embodiment in which the diameter of the thermostat 102 is about 84 mm, the diameter of the electronic display 516 is about 54 mm. According to some embodiments the curved shape of the front surface of thermostat 102, which is made up of the cover 514, the lens 510 and the front facing portion of the ring 512, is spherical, and matches a sphere having a radius of between 100 mm and 180 mm. According to some embodiments, the radius of the spherical shape of the thermostat front is about 156 mm.

Motion sensing with PIR sensor 550 as well as other techniques can be used in the detection and/or prediction of occupancy. According to some embodiments, occupancy information is used in generating an effective and efficient scheduled program. A second near-field proximity sensor 552 is also provided to detect an approaching user. The near-field proximity sensor 552 can be used to detect proximity in the range of up to 10-15 feet. the PIR sensor 550 and/or the near-field proximity sensor 552 can detect user presence such that the thermostat 102 can initiate "waking up" and/or providing adaptive screen displays that are based on user motion/position when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place our about to take place.

According to some embodiments, the thermostat 102 may be controlled by at least two types of user input, the first being a rotation of the outer rotatable ring 512 as shown in FIG. 5A, and the second being an inward push on head unit 540 until an audible and/or tactile "click" occurs. For such embodiments, the head unit 540 is an assembly that includes the outer ring 512, the cover 514, the electronic display 516, and the lens 510. When pressed inwardly by the user, the head unit 540 travels inwardly by a small amount, such as 0.5 mm, against an interior switch (not shown), and then springably travels back out when the inward pressure is released, providing a tactile "click" along with a corresponding audible clicking sound. Thus, for the embodiment of FIGS. 5A-5D, an inward click can be achieved by direct pressing on the outer rotatable ring 512 itself, or by indirect pressing of the outer rotatable ring 512 by virtue of providing inward pressure on the cover 514, the lens 510, or by various combinations thereof. For other embodiments, the thermostat 102 can be mechanically configured such that only the outer ring 512 travels inwardly for the inward click input, while the cover 514 and lens 510 remain motionless.

FIG. 5B and FIG. 5C are bottom and right side elevation views of the thermostat 102. According to some embodiments, the thermostat 102 includes a processing system 560, display driver 564 and a wireless communications system 566. The processing system 560 is adapted to cause the display driver 564 and display 516 to display information to the user, and to receiver user input via the outer rotatable ring 512. The processing system 560, according to some embodiments, is capable of carrying out the governance of the operation of thermostat 102 including various user interface features. The processing system 560 is further programmed and configured to carry out other operations, such as maintaining and updating a thermodynamic model for the enclosure in which the HVAC system is installed. According to some embodiments, a wireless communications system 566 is used to communicate with devices such as personal computers, other thermostats or HVAC system components, smart phones, local home wireless networks, routers, gateways, home appliances, security systems, hazard detectors, remote thermostat management servers, distributed sensors and/or sensor systems, and other components it the modern smart-home environment. Such communications may include peer-to-peer communications, communications through one or more servers located on a private network, or and/or communications through a cloud-based service.

According to some embodiments, the thermostat 102 includes a head unit 540 and a backplate (or wall dock) 542. Head unit 540 of thermostat 102 is slidably mountable onto back plate 542 and slidably detachable therefrom. According to some embodiments the connection of the head unit 540 to backplate 542 can be accomplished using magnets, bayonet, latches and catches, tabs, and/or ribs with matching indentations, or simply friction on mating portions of the head unit 540 and backplate 542. Also shown in FIG. 5A is a rechargeable battery 522 that is recharged using recharging circuitry 524 that uses power from backplate that is either obtained via power harvesting (also referred to as power stealing and/or power sharing) from the HVAC system control circuit(s) or from a common wire, if available. According to some embodiments, the rechargeable battery 522 may include a single cell lithium-ion battery, or a lithium-polymer battery.

Figure 6A:
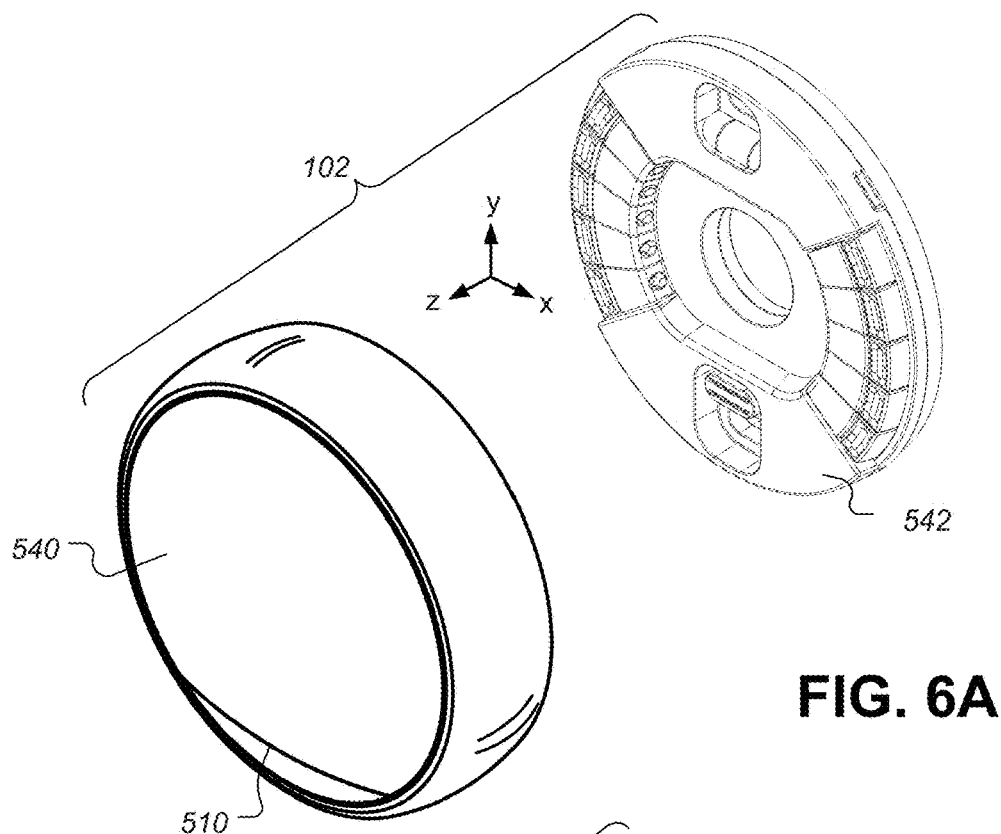
FIGS. 6A-6B illustrate exploded front and rear perspective views, respectively, of a thermostat with respect to its two main components, according to some embodiments.
Figure 6B:
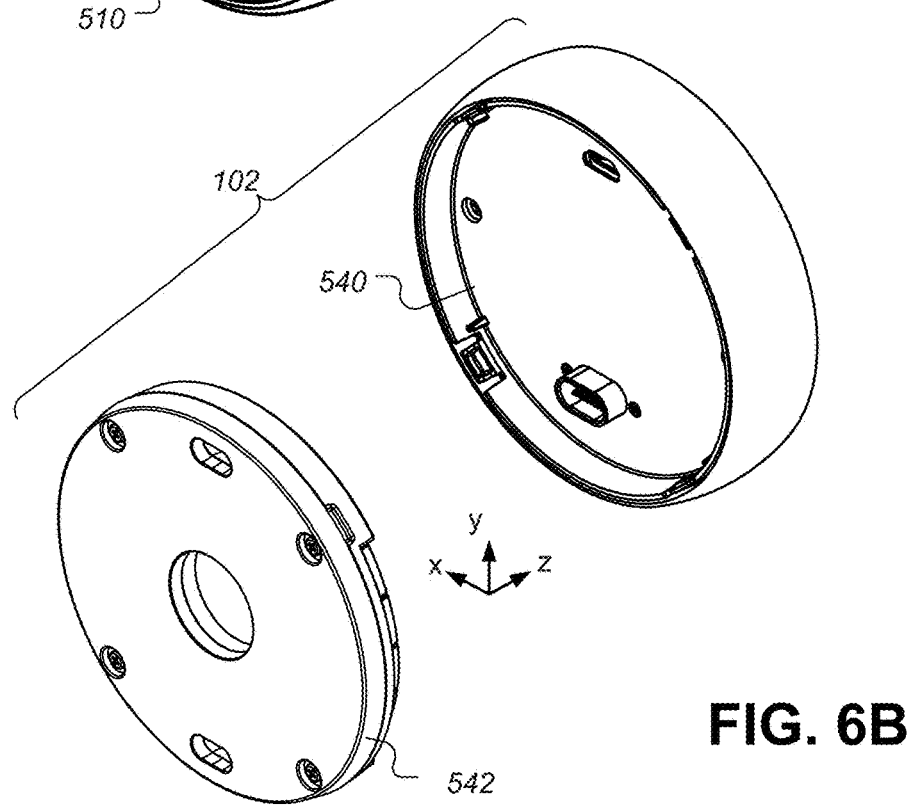

FIGS. 6A-6B illustrate exploded front and rear perspective views, respectively, of the thermostat 102 with respect to its two main components, which are the head unit 540 and the backplate 542. In the drawings shown herein, the "z" direction is outward from the wall, the "y" direction is the toe-to-head direction relative to a walk-up user, and the "x" direction is the user's left-to-right direction.

Figure 6C:
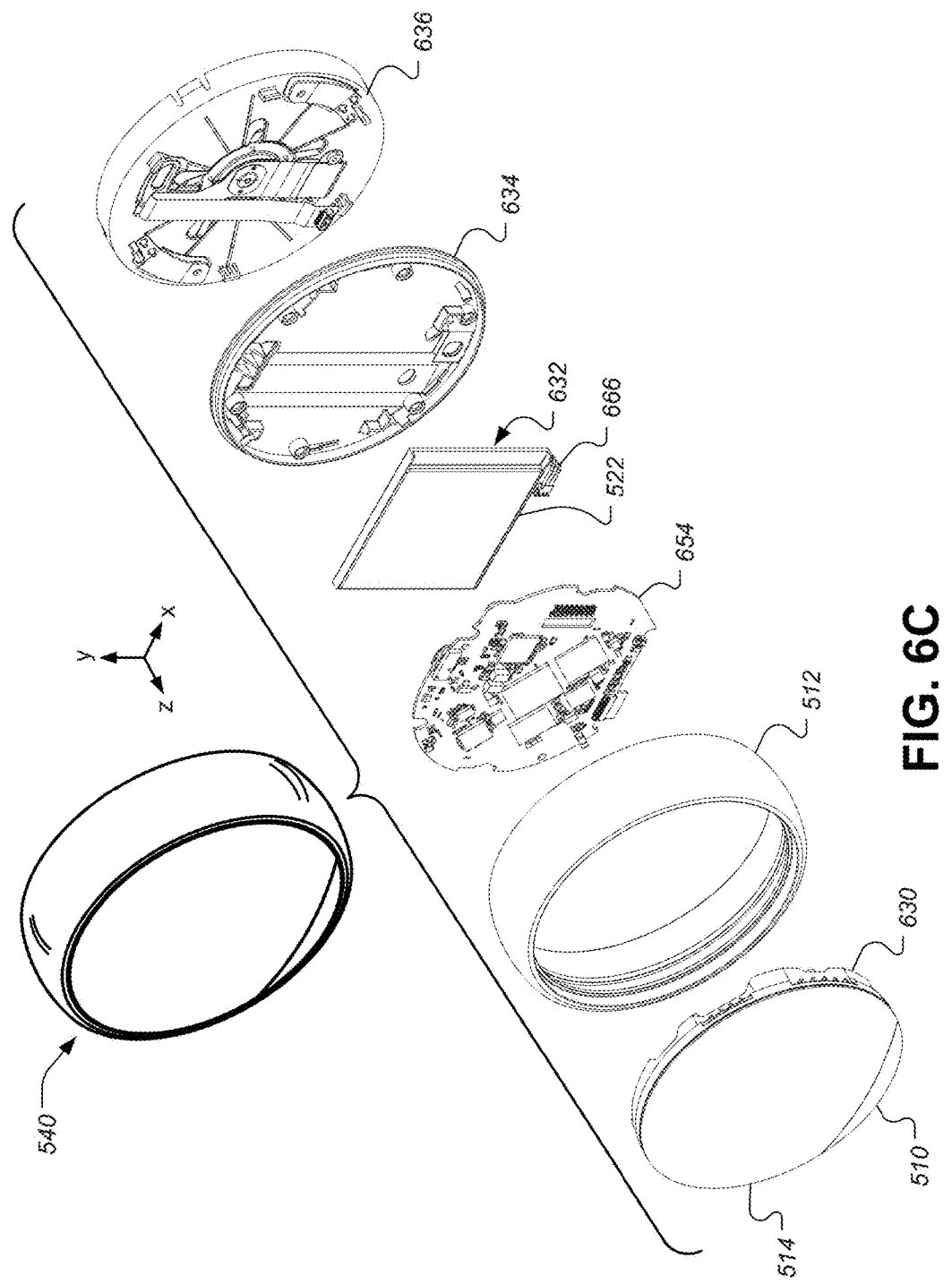
FIGS. 6C-6D illustrate exploded front and rear perspective views, respectively, of a head unit with respect to its primary components, according to some embodiments.
Figure 6D:
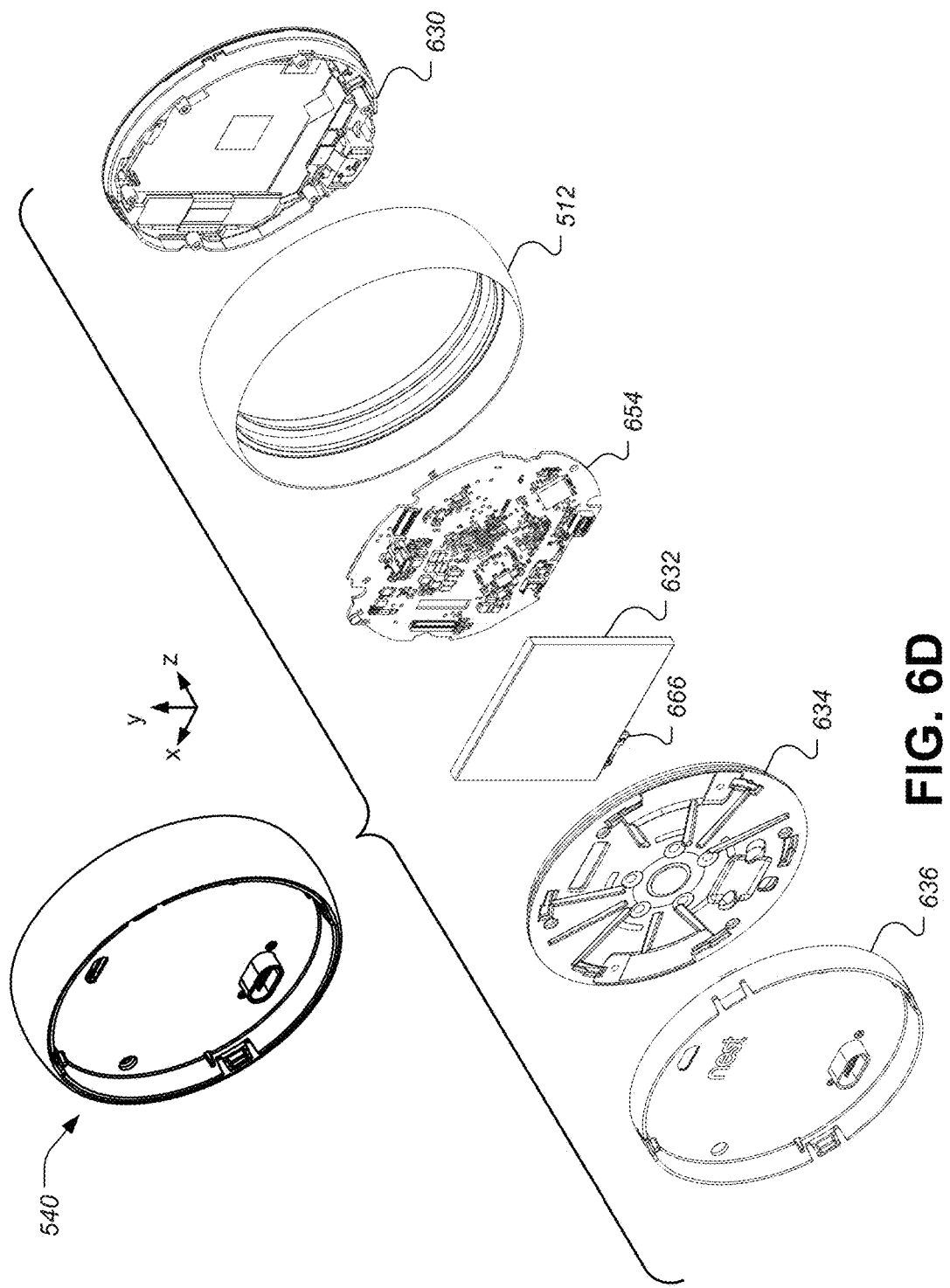

FIGS. 6C-6D illustrate exploded front and rear perspective views, respectively, of the head unit 540 with respect to its primary components. Head unit 540 includes, a back cover 636, a bottom frame 634, a battery assembly 632 with the rechargeable battery 522, a head unit printed circuit board (PCB) 654, the outer rotatable ring 512, the cover 514, and the lens 510. Behind the lens is the display assembly 630, which will be described in relation to FIGS. 6E-6F below. Electrical components on the head unit PCB 654 can connect to electrical components on the back plate 542 by virtue of a plug-type electrical connector on the back cover 636. The head unit PCB 654 is secured to head unit back cover 636 and display assembly 630. The outer rotatable ring 512 is held between a bearing surface on the display assembly 630 and bearing surfaces on the bottom frame 634. Motion of the outer rotatable ring 512 in the z direction is constrained by flat bearing surfaces on the display assembly 630 and bottom frame 634, while motion of the ring in x and y directions are constrained at least in part by circular rounded surfaces on the bottom frame 634. According to some embodiments, the bearing surfaces of the bottom frame 634 and/or the display assembly 630 are greased and/or otherwise lubricated to both smooth and dampen rotational movement for the outer ring 512. The head unit printed PCB 654 may include some or all of processing system 560, display driver 564, wireless communication system 566, and battery recharging circuitry 524 as shown and described with respect to FIG. 5A, as well as one or more additional memory storage components. According to some embodiments, circuitry and components are mounted on both sides of head unit PCB 654. Although not shown, according to some embodiments, shielding can surround circuitry and components on both sides of the head unit PCB 654.

Battery assembly 632 includes a rechargeable battery 522. Battery assembly 632 also includes connecting wires 666, and a battery mounting film that is attached to battery 522 using a strong adhesive and/or the any rear shielding of head unit PCB 654 using a relatively weaker adhesive. According to some embodiments, the battery assembly 632 is user-replaceable.

Figure 6E:
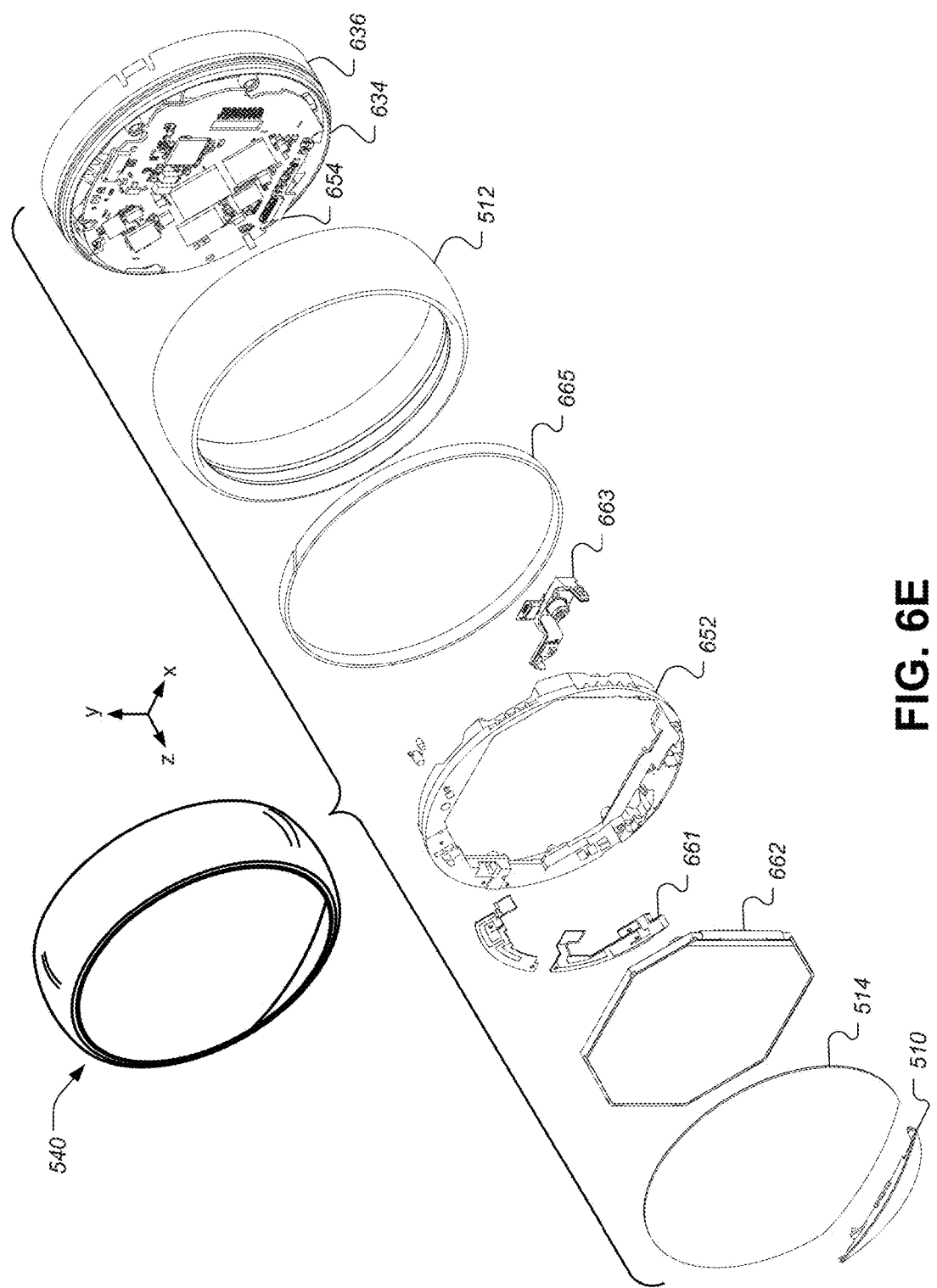
FIGS. 6E-6F illustrate exploded front and rear perspective views, respectively, of a head unit display assembly with respect to its primary components, according to some embodiments.
Figure 6F:
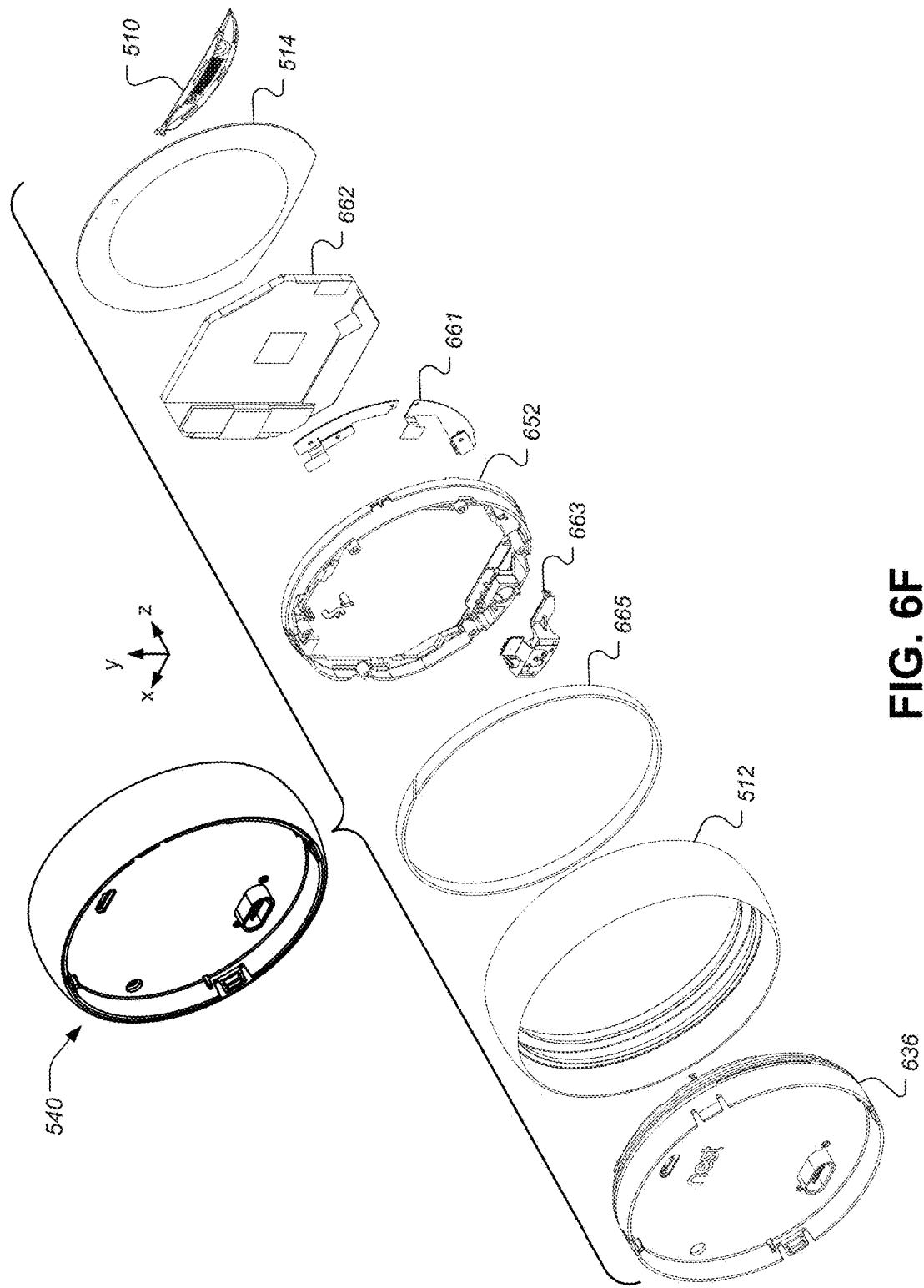

FIGS. 6E-6F illustrate exploded front and rear perspective views, respectively, of the head unit 540 with an exploded view of the display assembly 630. The display assembly 630 comprises the cover 514, the lens 510, an LCD module 662, a pair of RF antennas 661, a head unit top frame 652, a sensor flex assembly 663, and a magnetic ring 665. The sensor flex assembly 663 connects to the head unit PCB 654 using a connector on a flexible PCB. The sensor flex assembly 663 also includes the PIR sensor 550 and the near-field proximity sensor 552. Additionally, the sensor flex assembly 663 may include a temperature sensor IC that is positioned close to the lens 515 so as to accurately measure temperature outside of the thermostat 102 without being overly affected by internal heating of thermostat components. The sensor flex assembly 663 may be comprised of these three sensors, along with a flexible PCB (including the connector for the head unit PCB 654) and a plastic bracket to which the sensors and flexible PCB are mounted. The bracket ensures that the sensor flex assembly 663 is positioned and oriented consistently and correctly with respect to the lens 510. The lens 510 includes two sections that are thinned to approximately 0.3 mm in front of the near-field proximity sensor 552 and the temperature sensor. The lens 510 also includes a section with a Fresnel lens pattern in front of the PIR sensor 550. In some embodiments, additional temperature sensors may be placed throughout the thermostat 102, such as a temperature sensor on the head unit PCB 654 and a temperature sensor on the back plate PCB 680.

The head unit PCB 554 includes a Hall effect sensor that senses rotation of the magnetic ring 665. The magnetic ring 665 is mounted to the inside of the outer rotatable ring 512 using an adhesive such that the outer rotatable ring 512 and the magnetic ring 665 are rotated together. The magnetic ring 665 includes striated sections of alternating magnetic polarity that are diagonally positioned around the magnetic ring 665. The Hall effect sensor senses the alternations between magnetic polarities as the outer ring 512 is rotated. The Hall effect sensor can be controlled by a primary processor, which is a higher powered processor, without excessive power drain implications because the primary processor will invariably be awake already when the user is manually turning the outer rotatable ring 512 to control the user interface. Advantageously, very fast response times can also be provided by the primary processor.

The antennas 661 are mounted to the top surface of the head unit top frame 652. The wireless communications system 566 may include Wi-Fi radios of various frequencies (e.g., 2.4 GHz and 5.0 GHz), along with an IEEE 802.15.4-compliant radio unit for a local-area smart home device network that may include other thermostats, hazard detectors, security system modules, and so forth. The IEEE 802.15.4 unit may use the Thread protocol for achieving such communications. In some embodiments, the wireless communications system 566 may also include a Bluetooth low energy (BLE) radio for communication with user devices.

The processing system 560 may be distributed between the head unit PCB 654 and the backplate PCB 680, and may include a primary processor and a secondary processor. The primary processor may be a comparatively high-powered processor, such as the AM3703 chip, or the MCIMX6X3EVK10AB chip from Freescale™, and may be programmed to perform sophisticated thermostat operations, such as time-to-temperature calculations, occupancy determination algorithms, ambient temperature compensation calculations, software updates, wireless transmissions, operation of the display driver 564, and regulation of the recharging circuitry 524. The secondary processor, such as the STM32L chip from ST microelectronics, may be a comparatively low-power processor when compared to the primary processor. The secondary processor may interact with the HVAC system to control a series of FET switches that control the functioning of the HVAC system. The secondary processor may also interface with various sensors in thermostat 102, such as the temperature sensors, a humidity sensor, an ambient light sensor, and/or the like. The secondary processor may also share duties with the primary processor in regulating the recharging circuitry 522 to provide power to all of the electrical systems on board the thermostat 102. Generally, the primary processor will operate in a "sleep" mode until high-power processing operations (e.g., wireless communications, user interface interactions, time-to-temperature calculations, thermal model calculations, etc.) are required, while the secondary processor will operate in an "awake" mode more often than the primary processor in order to monitor environmental sensors and wake the primary processor when needed.

FIGS. 6G-6H illustrate exploded front and rear perspective views, respectively, of the back plate unit 542 with respect to its primary components, according to some embodiments. Back plate unit 542 comprises a back plate rear plate 682, a back plate PCB 680, and a back plate cover 670. Visible in FIG. 6G are the HVAC wire connectors 684 that include integrated mechanical wire insertion sensing circuitry, and relatively large capacitors 686 that are used by part of the power stealing circuitry that is mounted on the back plate PCB 680. According to some embodiments, backplate 542 includes electronics and a temperature/humidity sensor in housing. Wire connectors 684 are provided to allow for connection to HVAC system wires, which pass though the large central circular opening 690, which is visible in each of the backplate primary components. Also visible in each of the backplate primary components are two mounting holes 692 and 694 for use in fixing the backplate to the wall. Also visible in FIGS. 6G-6H are a bubble level 672 to allow the user to install the thermostat 102 in a level position without additional tools.

The back plate PCB 680 also may include approximately seven custom power isolation ICs 685 that isolate the internal electronics of the thermostat 102 from the relatively high 24 VAC signals of the HVAC system. The power isolation ICs 685 are custom software-resettable fuses that both monitor transient and anomalous voltage/current signals on the HVAC power/return wires and switch off the connection to isolate the thermostat against any dangerous signals that could damage the internal electronics. The power isolation ICs 685 receive command signals encoded in a clock square wave from the processing system 560 to open and close a pair of power FETs for each HVAC return wire in order to activate the corresponding HVAC function (e.g., fan, air-conditioning, heat, heat pump, etc.). A complete description of the power isolation ICs 685 is given in the commonly assigned U.S. patent application Ser. No. 14/591,804 filed on Jan. 7, 2015, which is hereby incorporated herein by reference in its entirety for all purposes.

Figure 7:
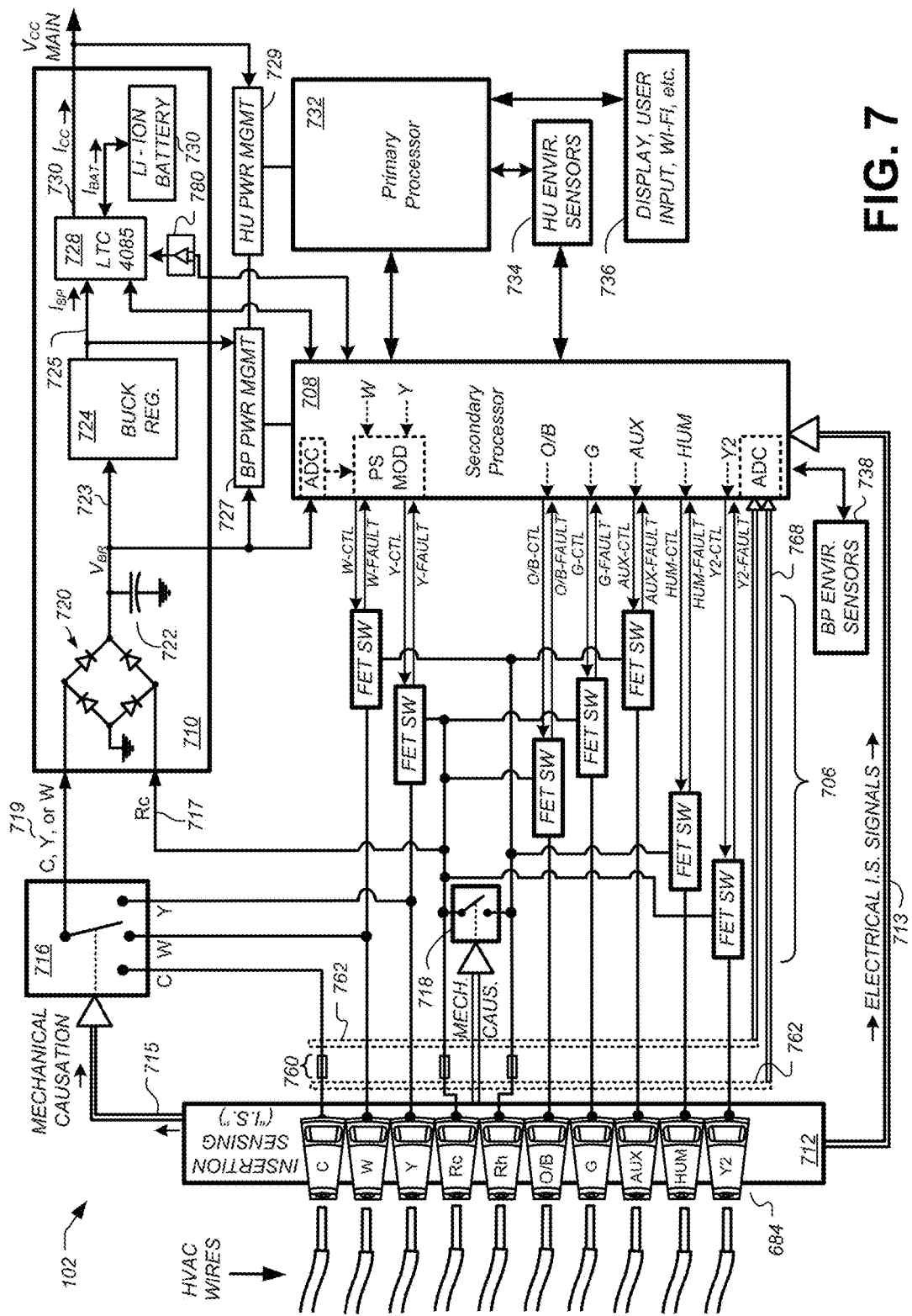
FIG. 7 illustrates a block diagram illustrating circuitry within a thermostat, according to some embodiments.

FIG. 7 illustrates a power management and power harvesting system for a smart thermostat, according to some embodiments. FIG. 7 shows connections to common HVAC wiring, such as a W (heat call relay wire); Y (cooling call relay wire); Y2 (second stage cooling call relay wire); Rh (heat call relay power); Rc (cooling call relay power); G (fan call relay wire); O/B (heat pump call relay wire); AUX (auxiliary call relay wire); HUM (humidifier call relay wire); and C (common wire). As discussed above, the thermostat 102 comprises a plurality of FET switches 706 (such as the power isolation ICs 685 of FIG. 6H above) used for carrying out the essential thermostat operations of connecting or "shorting" one or more selected pairs of HVAC wires together according to the desired HVAC operation. The operation of each of the FET switches 706 is controlled by the secondary processor 708 which can comprise, for example, an STM32L 32-bit ultra-low power ARM-based microprocessor available from ST Microelectronics.

Thermostat 102 further comprises powering circuitry 710 that comprises components contained on both the backplate 542 and head unit 540. Generally speaking, it is the purpose of powering circuitry 710 to extract electrical operating power from the HVAC wires and convert that power into a usable form for the many electrically-driven components of the thermostat 102. Thermostat 102 further comprises insertion sensing components 712 configured to provide automated mechanical and electrical sensing regarding the HVAC wires that are inserted into the thermostat 102. Thermostat 102 further comprises a relatively high-power primary processor 732, such as an AM3703 Sitara ARM microprocessor available from Texas Instruments, that provides the main general governance of the operation of the thermostat 102. Thermostat 102 further comprises environmental sensors 734/738 (e.g., temperature sensors, humidity sensors, active IR motion sensors, passive IR motion sensors, multi-channel thermopiles, ambient visible light sensors, accelerometers, ambient sound sensors, ultrasonic/infrasonic sound sensors, microwave sensors, GPS sensors, etc.), as well as other components 736 (e.g., electronic display devices and circuitry, user interface devices and circuitry, wired communications circuitry, wireless communications circuitry, etc.) that are operatively coupled to the primary processor 732 and/or secondary processor 708 and collectively configured to provide the functionalities described in the instant disclosure.

The insertion sensing components 712 include a plurality of HVAC wiring connectors 684, each containing an internal springable mechanical assembly that, responsive to the mechanical insertion of a physical wire thereinto, will mechanically cause an opening or closing of one or more dedicated electrical switches associated therewith. With respect to the HVAC wiring connectors 684 that are dedicated to the C, W, Y, Rc, and Rh terminals, those dedicated electrical switches are, in turn, networked together in a manner that yields the results that are illustrated in FIG. 7 by the blocks 716 and 718. The output of block 716, which is provided at a node 719, is dictated solely by virtue of the particular combination of C, W, and Y connectors into which wires have been mechanically inserted in accordance with the following rules: if a wire is inserted into the C connector, then the node 719 becomes the C node regardless of whether there are any wires inserted into the Y or W connectors; if no wire is inserted into the C connector and a wire is inserted into the Y connector, then the node 719 becomes the Y node regardless of whether there is a wire inserted into the W connector; and if no wire is inserted into either of the C or Y connectors, then the node 719 becomes the W node. Block 718 is shown as being coupled to the internal sensing components 712 by virtue of double lines termed "mechanical causation," for the purpose of denoting that its operation, which is either to short the Rc and Rh nodes together or not to short the Rc and Rh nodes together. Whether the block 718 will short, or not short, the Rc and Rh nodes together is dictated solely by virtue of the particular combination of Rc and Rh connectors into which wires have been mechanically inserted. Block 718 will keep the Rc and Rh nodes shorted together, unless wires have been inserted into both the Rc and Rh connectors, in which case the block 718 will not short the Rc and Rh nodes together because a two-HVAC-transformer system is present. The insertion sensing circuitry 712 is also configured to provide at least two signals to the secondary processor 708, the first being a simple "open" or "short" signal that corresponds to the mechanical insertion of a wire, and the second being a voltage or other level signal that represents a sensed electrical signal at that terminal. The first and second electrical signals for each of the respective wiring terminals can advantageously be used as a basis for basic "sanity checking" to help detect and avoid erroneous wiring conditions.

Basic operation of each of the FET switches 706 is achieved by virtue of a respective control signal (e.g., W-CTL, Y-CTL) provided by the secondary processor 708 that causes the corresponding FET switch 706 to "connect" or "short" its respective HVAC lead inputs for an ON control signal, and that causes the corresponding FET switch 706 to "disconnect" or "leave open" or "open up" its respective HVAC lead inputs for an "OFF" control signal. By virtue of the above-described operation of block 718, it is automatically the case that for single-transformer systems having only an "R" wire (rather than separate Rc and Rh wires as would be present for two-transformer systems), that "R" wire can be inserted into either of the Rc or Rh terminals, and the Rh-Rc nodes will be automatically shorted to form a single "R" node, as needed for proper operation. In contrast, for dual-transformer systems, the insertion of two separate wires into the respective Rc and Rh terminals will cause the Rh-Rc nodes to remain disconnected to maintain two separate Rc and Rh nodes, as needed for proper operation.

Referring now to the powering circuitry 710 in FIG. 7, provided is a configuration that automatically adapts to the powering situation presented to the thermostat 102 at the time of installation and thereafter. The powering circuitry 710 comprises a full-wave bridge rectifier 720, a storage and waveform-smoothing bridge output capacitor 722 (which can be, for example, on the order of 30 microfarads), a buck regulator circuit system 724, a power-and-battery (PAB) regulation circuit 728, and a rechargeable lithium-ion battery 730. In conjunction with other control circuitry including backplate power management circuitry 727, head unit power management circuitry 729, and the secondary processor 708, the powering circuitry 710 is configured and adapted to have the characteristics and functionality described hereinbelow.

By virtue of the configuration illustrated in FIG. 7, when there is a "C" wire presented upon installation, the powering circuitry 710 operates as a relatively high-powered, rechargeable-battery-assisted AC-to-DC converting power supply. When there is not a "C" wire presented, the powering circuitry 710 operates as a power-stealing, rechargeable-battery-assisted AC-to-DC converting power supply. As illustrated in FIG. 7, the powering circuitry 710 generally serves to provide the voltage Vcc MAIN that is used by the various electrical components of the thermostat 102, and that in one embodiment will usually be about 3.7V~3.95V. The general purpose of powering circuitry 710 is to convert the 24 VAC presented between the input leads 719 and 717 to a steady DC voltage output at the Vcc MAIN node to supply the thermostat electrical power load.

Operation of the powering circuitry 710 for the case in which the "C" wire is present is now described. When the 24 VAC input voltage between nodes 719 and 717 is rectified by the full-wave bridge rectifier 720, a DC voltage at node 723 is present across the bridge output capacitor 722, and this DC voltage is converted by the buck regulator system 724 to a relatively steady voltage, such as 4.4 volts, at node 725, which provides an input current $I_{BP}$ to the power-and-battery (PAB) regulation circuit 728.

The secondary processor 708 controls the operation of the powering circuitry 710 at least by virtue of control leads leading between the secondary processor 708 and the PAB regulation circuit 728, which for one embodiment can include an LTC4085-4 chip available from Linear Technologies Corporation. The LTC4085-4 is a USB power manager and Li-Ion/Polymer battery charger originally designed for portable battery-powered applications. The PAB regulation circuit 728 provides the ability for the secondary processor 708 to specify a maximum value $I_{BP}(max)$ for the input current $I_{BP}$. The PAB regulation circuit 728 is configured to keep the input current at or below $I_{BP}(max)$, while also providing a steady output voltage Vcc, such as 4.0 volts, while also providing an output current Icc that is sufficient to satisfy the thermostat electrical power load, while also tending to the charging of the rechargeable battery 730 as needed when excess power is available, and while also tending to the proper discharging of the rechargeable battery 730 as needed when additional power (beyond what can be provided at the maximum input current $I_{BP}(max)$) is needed to satisfy the thermostat electrical power load.

Operation of the powering circuitry 710 for the case in which the "C" wire is not present is now described. As used herein, "inactive power stealing" refers to the power stealing that is performed during periods in which there is no active call in place based on the lead from which power is being stolen. As used herein, "active power stealing" refers to the power stealing that is performed during periods in which there is an active call in place based on the lead from which power is being stolen.

During inactive power stealing, power is stolen from between, for example, the "Y" wire that appears at node 719 and the Rc lead that appears at node 717. There will be a 24 VAC HVAC transformer voltage present across nodes 719/717 when no cooling call is in place (i.e., when the Y-Rc FET switch is open). For one embodiment, the maximum current $I_{BP}(max)$ is set to a relatively modest value, such as 20 mA, for the case of inactive power stealing. Assuming a voltage of about 4.4 volts at node 725, this corresponds to a maximum output power from the buck regulator system 724 of about 88 mW. This power level of 88 mW has been found to not accidentally trip the HVAC system into an "on" state due to the current following through the call relay coil. During this time period, the PAB regulator 728 operates to discharge the battery 730 during any periods of operation in which the instantaneous thermostat electrical power load rises above 88 mW, and to recharge the battery (if needed) when the instantaneous thermostat electrical power load drops below 88 mW. The thermostat 700 is configured such that the average power consumption is well below 88 mW, and indeed for some embodiments is even below 10 mW on a long-term time average.

Operation of the powering circuitry 710 for "active power stealing" is now described. During an active heating/cooling call, it is necessary for current to be flowing through the HVAC call relay coil sufficient to maintain the HVAC call relay in a "tripped" or ON state at all times during the active heating/cooling call. The secondary processor 708 is configured by virtue of circuitry denoted "PS MOD" to turn, for example, the Y-Rc FET switch OFF for small periods of time during the active cooling call, wherein the periods of time are small enough such that the cooling call relay does not "un-trip" into an OFF state, but wherein the periods of time are long enough to allow inrush of current into the bridge rectifier 720 to keep the bridge output capacitor 722 to a reasonably acceptable operating level. For one embodiment, this is achieved in a closed-loop fashion in which the secondary processor 708 monitors the voltage $V_{BR}$ at node 723 and actuates the signal Y-CTL as necessary to keep the bridge output capacitor 722 charged. According to one embodiment, it has been found advantageous to introduce a delay period, such as 60-90 seconds, following the instantiation of an active heating/cooling cycle before instantiating the active power stealing process. This delay period has been found useful in allowing many real-world HVAC systems to reach a kind of "quiescent" operating state in which they will be much less likely to accidentally un-trip away from the active cooling cycle due to active power stealing operation of the thermostat 102. According to another embodiment, it has been found further advantageous to introduce another delay period, such as 60-90 seconds, following the termination of an active cooling cycle before instantiating the inactive power stealing process. This delay period has likewise been found useful in allowing the various HVAC systems to reach a quiescent state in which accidental tripping back into an active cooling cycle is avoided.

High Order Polygonal LCD

Figure 8A:
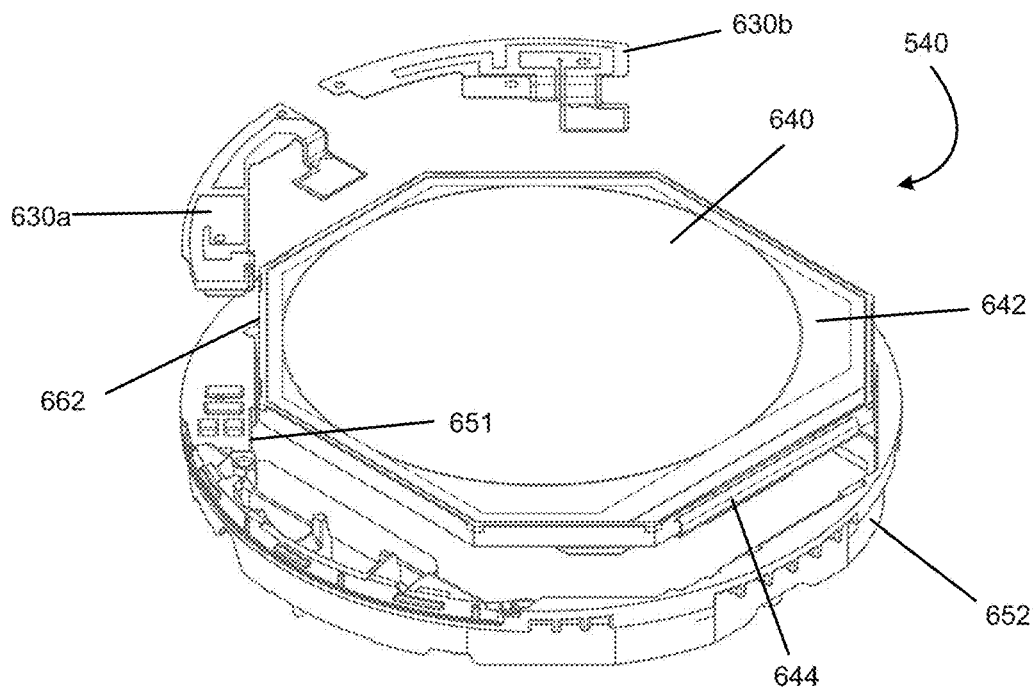
FIGS. 8A-8B illustrates an exploded perspective view and a top view of several components of a head unit and further illustrates several components of the head unit.
Figure 8B:
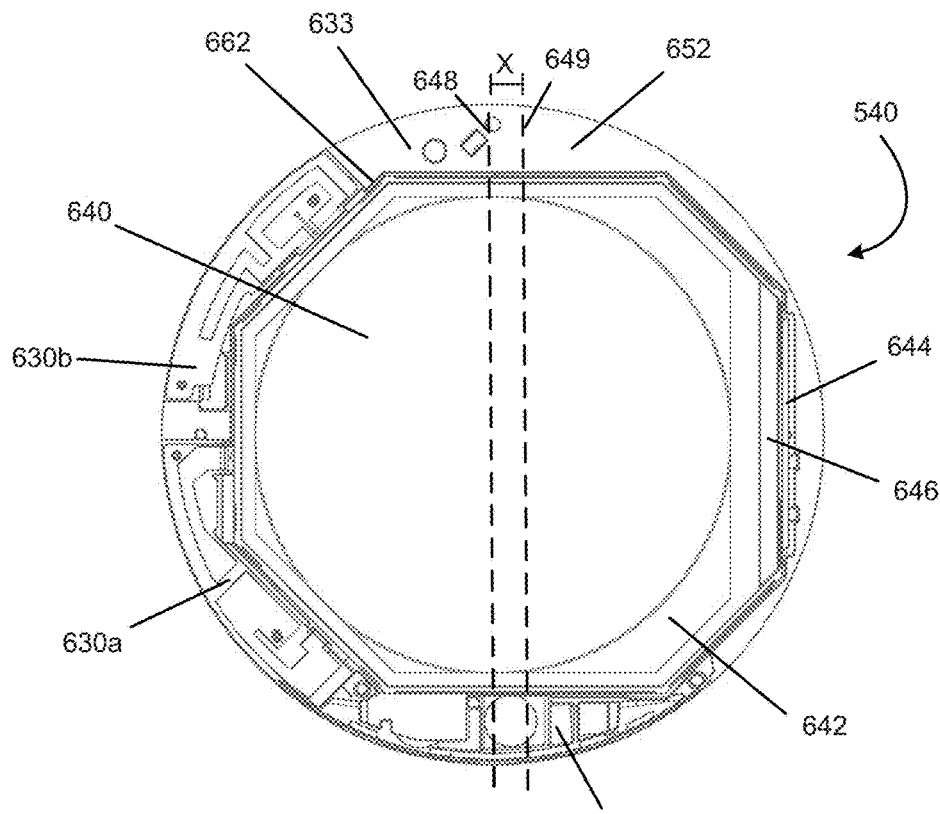

Referring now to FIGS. 8A and 8B, illustrated are components of the head unit 540, which may also be called a front assembly. Specifically, FIG. 8A illustrates an exploded perspective view of several components of the head unit or front assembly 540 (hereinafter head unit 540) and FIG. 8B illustrates a top view of the assembled components. In particular, the liquid crystal display (LCD) or liquid crystal module (LCM) assembly is illustrated in FIGS. 8A and 8B (hereinafter LCD). The LCD is used to display information to a user of the thermostat, such as a current setpoint temperature, a current ambient temperature, a time to reach a setpoint temperature, various menus or options, and/or any other graphic that is desired for display to the user. The components that are illustrated in FIGS. 8A-B include the frame 652 for the assembly. The frame 652 is configured to house and support the LCD 662 and various other components of the head unit, such as various sensors, antennas, and the like. The frame 652 includes a recessed portion 651 that is shaped and sized to accommodate the LCD 662 and various other components of the head unit 540, such as the antennas, 630a and 630b. In some embodiments, the recessed portion 651 may have the same or a similar non-rectangular polygon shape as the LCD 662. The recessed portion 651 may include one or more protrusions or ledges upon which the LCD 662 and/or other components rest.

The frame 652 may be generally ring shaped with a relatively open bottom. The frame 652 is configured to couple or attach with the bottom frame 634 of the head unit 540. The open bottom configuration of the frame 652 allows the LCD to be electrically and communicatively coupled with components that are positioned within, adjacent, or atop the back cover 636. Specifically, a pin 504 that is attached at a distal end of a flexible ribbon 500 may be coupled to a circuit board (not shown), which in turn is communicatively coupled with the LCD 662. The flexible ribbon 500 may also electrically couple the LCD 662, circuit board (not shown), and various other electrical components with a power source of the thermostat (e.g., battery or in-home power).

As briefly described above, the LCD 662 has a non-rectangular polygon shape and is positioned within an interior region of the circular head unit 540. The LCD 662 may have a high order polygonal shape that approximates the shape of the circular head unit, where the term "high order" means having a high number of sides, such as 7 or more sides. The high number of sides allows the LCD 662 to be more circular in shape in comparison with conventional rectangular LCDs or most rectangular LCDs that may have rounded or chamfered corners. The more circular shape is advantageous in the present embodiments since the head unit has a circular shape. In a specific embodiment, the LCD 662 is octagonal in shape, although various other shapes could also be employed, such as pentagonal, hexagonal, heptagonal, nonagonal, decagonal, etc. The corners of the N-gon shaped device may also be rounded as desired, but are typically not rounded due to the increased complexity of manufacturing or producing such corners. In some instances, the N-gon shape may be produced using a scribe and break method, in which the LCD 662 is scored and the edges are broken or removed. Producing rounded corners via such methods is relatively difficult and/or time consuming. Similarly, increasing the number of sides of the N-gon shaped device requires additional manufacturing time. The octagonal shape of the LCD 662 has been found to provide a good balance between providing a more circular outer profile, which reduces the area within the frame 652 that the LCD 662 occupies, without significantly increasing the manufacturing time and costs.

The LCD 662 includes an active display portion or region 640 that includes pixels that are configured to display information to a user, specifically by being turned on and off as is known in the art. As illustrated in FIG. 8B, the LCD 662 is positioned within the interior region of the head unit 540 and frame 652 so that the active display region 640 is positioned roughly centrally relative to the head unit 540. This positioning allows information to be displayed centrally relative to a viewing window of the thermostat, which provides a uniformity that may be desirable to users.

The LCD 662 also includes a non-active portion or region 642 that surrounds the active display region 640. The non-active portion or region 642 typically does not include pixels that are controlled to display information. Rather, the non-active region 642 is the region within which are positioned traces, drivers, and various other components that are used to control the active region 640. For example, a flex panel connector or ribbon 644 is attached to one side of the LCD 662. The flex panel connector 644 communicatively couples the LCD 662 with the circuit board (not shown) by having an opposite end (not shown) that plugs into the circuit board. The flex panel connector 644 may include driver chips and other components that enable instructions, signals, or information to be communicated between the LCD 662 and circuit board for various purposes, such as powering the LCD 662, providing backlight, displaying information, and the like. In one embodiment, the flex panel connector 644 may convert a 40 pin connector to a 100 or more pin connector. Additional driver chips may be positioned on the LCD 662, such as on the chip on glass or driver ledge 646.

Traces (not shown) may fan or spread out from the driver ledge 646 and around the periphery of the active display region 640. The traces are typically found around most of the active display region 640, which is one reason why the non-active region 642 mostly or entirely surrounds the active display region 640. The driver chips or other control components are typically positioned adjacent the flex panel connector 644 on one side of the LCD 662, which requires a larger non-active region 642 on that side of the LCD 662 in comparison with an opposite side. In addition, there are typically fewer traces that are positioned on the edge or side of the LCD 662 that is opposite the flex panel connector 644, so the non-active region 642 on the side or edge opposite the flex panel connector 644 may be smaller. Similarly, the top and/or bottom edge of the LCD 662 includes fewer traces and/or control components than the edge or side adjacent the flex panel connector 644, which allows the non-active region 642 to be sized smaller on the top and/or bottom edge.

This configuration—i.e., with a larger non-active region 642 adjacent the flex panel connector 644 and smaller non-active regions 642 elsewhere—results in the active display region 640 being positioned offset or off-center from a center of the LCD 662. For example, as shown in FIG. 8B, a plane 648 that intersects a central axis of the active display region 640 and is orthogonal to at least one side of the LCD 662 (e.g., bottom side) is offset by a distance X from a similar plane 649 that intersects a central axis of the LCD 662 and that is orthogonal to at least one side of the LCD 662 (e.g., bottom side). The central axes between the active display region 640 and LCD 662 is likewise offset from each other. Since the active display region 640 is typically centrally positioned relative to the head unit 540 and thermostat, the result is that the LCD 662 is typically positioned closer to one side of the frame 652 to accommodate the offset relationship of the active display region 640 and the LCD 662.

Positioning of all or most of the driver chips and/or other control components adjacent the flex panel connector 644 and one side or edge of the LCD 662 may result in that side/edge of the LCD 662 being larger than the opposite side or edge of the LCD 662. For example, FIG. 8B illustrates that the right side or edge of the LCD 662 is wider, longer, or otherwise larger than the left side or edge of the LCD 662. This configuration results in the LCD 662 being non-symmetric about the plane 649 that is positioned centrally relative to the LCD and orthogonal to at least one side (e.g., the top and bottom sides). As described in greater detail below, this non-symmetric configuration of the LCD and/or offset configuration of the LCD 662 and active display region 640 minimizes the interference of the LCD 662 with additional components that are positioned around the LCD's perimeter, such as various antennas, sensors, and the like. In addition, positioning most of the driver chips and/or other control components adjacent the wider or widest portion of the LCD 662 minimizes the interferences of these components with the antennas, sensors, or other components positioned around the LCD's perimeter.

Positioned within the frame 652 and radially outside of the LCD 662 are additional components, such as one or more sensors, antennas, and the like. The sensors may include a temperature sensor that is configured to sense an ambient temperature of a room within which the thermostat is positioned. In some embodiments, the temperature sensor may be positioned within a sensor region 631, which is located near the bottom edge of the frame 652. One or more additional sensors may be positioned in the sensor region 631 of the head unit 540. One or more antennas, 630a and 630b, are also positioned within the frame 652 and within the interior region of the head unit 540. The antennas, 630a and 630b, may be configured to wirelessly communicate with devices that are located external to the thermostat, such as with other smart home devices (e.g., light fixtures, hazard detectors, smoke detectors, cameras, monitors, appliances, and the like). In one embodiment, the antenna 630b may be 6LoWPAN antenna while antenna 630a is a WiFi enabled antenna. The head unit 540 may have additional antennas and/or sensors as well. For example, a BlueTooth LE Antenna may be positioned in area 633, which is adjacent the top portion of the frame 652.

As shown in FIG. 8B, in some embodiments, one or more of the antennas (i.e., 630a and 630b) may be positioned along two or more sides of the frame 652. Specifically, the antenna, 630b and/or 630a, may extend partially or fully along one side or edge of the frame 652 and partially or fully along a second side or edge of the frame 652. In some embodiments, the antenna, 630b and/or 630a, may extend partially or fully along a third side or edge of the frame 652. In some embodiments, one or more of the antennas (i.e., 630b, 630a, 633, and the like) may be operationally coupled with a frame 652 of the device. Operationally coupling the antennas with the frame 652 may improve the operation and/or reception capabilities of the antennas. In a specific embodiment, the frame 652 may be made of a metal material and the antennas (630b, 630a, and/or 633) may be electrically grounded to the frame 652. The antennas (630b, 630a, and/or 633) may also be electrically coupled with the interior surface of the frame 652 of the thermostat body, which may also be made of a metallic material. In some embodiments, the sensors (i.e., temperature sensor) may additionally or alternatively be operationally coupled with the frame 652. For example, the temperature sensor may be attached to the metallic frame since the metallic frame may be more sensitive and responsive to variations in temperature.

The n-sided non-rectangular polygon shape of the LCD 662, and specifically the octagon shape, allows the antennas (630b, 630a, 633, and the like) to be positioned around the outer periphery of the frame 652 while minimizing the diameter of the unit. Further, the shape allows the antenna areas (630b, 630a, 633, and the like) to be roughly rectangular or square in shape, which is difficult to achieve in a circular head unit with minimized space using rectangular or square LCDs since the corners of the square or rectangular LCDs occupy or protrude into the area of the antennas. The n-sided non-rectangular polygon shape of the LCD 662, and the octagon shape in particular, optimizes the area and placement of the sensors and/or antennas and thus, is ideal for circular or round shaped thermostats.

Motion Control Assembly

Figure 9A:
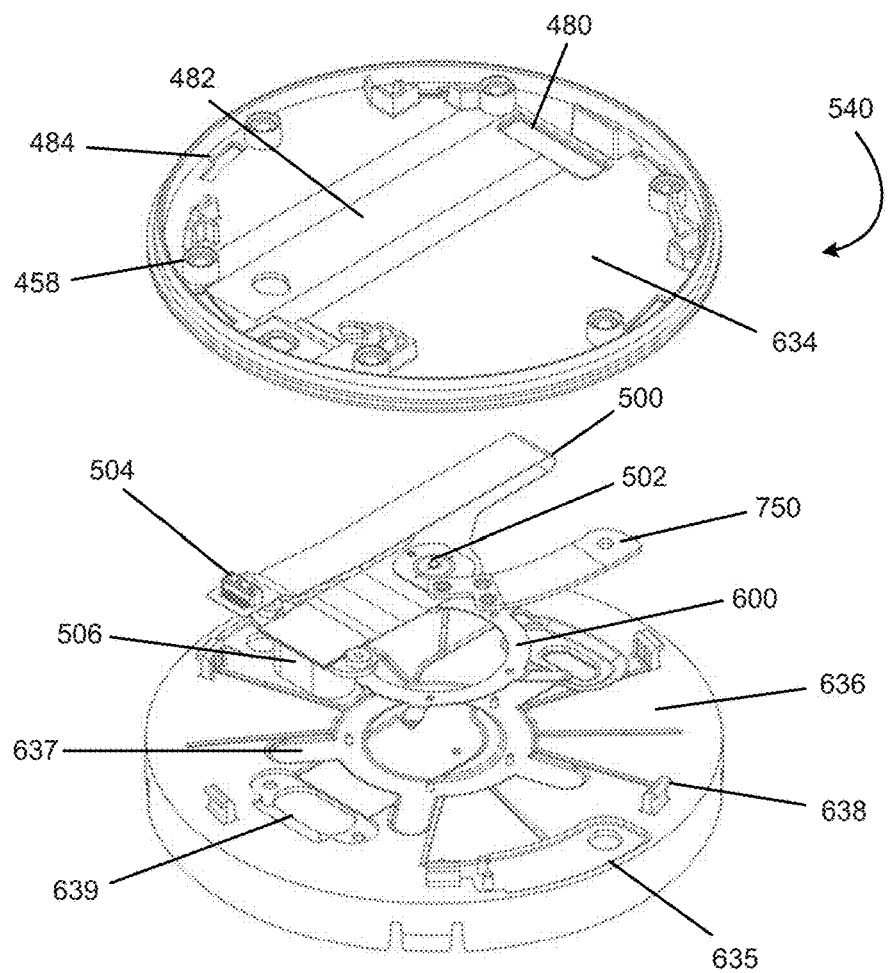
FIG. 9A illustrates an exploded perspective view of several components of the head unit including a bottom frame and back cover.

Referring now to FIG. 9A, illustrated is an exploded perspective view of the rear components of the head unit or front assembly 540. FIG. 9A illustrates the bottom frame 634, which may also be referred to as a frame member or front member since it is the front member of the assembly illustrated in FIG. 9A. The components also include a spring 600 and a back cover 636, which may also be referred to as a rear member since it is the rear or back portion of the head unit 540. As described above, the back cover or rear member 636 is not the rearward most component in the thermostat assembly. Rather, the back cover 636 is configured to couple with the backplate 542. The components of FIG. 9A illustrate how the bottom frame 634 functions with the back cover 636 and spring 600 to control a movement of the head unit 540 and thermostat device when a user presses axially inward on the thermostat/head unit 540. The interaction of these components is described in greater detail below. The bottom frame 634 is designed to fasten with the frame 652 previously described via one or more screws, bolts, snaps, clamps, cams, or other mechanical fasteners. For example, the bottom frame 634 may include a plurality of threaded bosses 458 that are configured to receive a screw or bolt that is positioned through an aperture in the frame 652 or another component of the head unit 540. The bottom frame 634 serves as a lower support member for the components of the head unit 540 and various other components, such as the flex ribbon 500.

As shown in FIG. 9A, the bottom frame 634 is positioned axially forward of the back cover 636. The spring 600 is disposed between the bottom frame 634 and the back cover 636 and is configured to bias the bottom frame 634 axially upward and away from the back cover 636 as described in greater detail below. A switch 502 is also disposed between the bottom frame 634 and the back cover 636. The switch 502 may be positioned approximately centrally between the two components, or elsewhere as desired. The switch 502 may be positioned on the flex ribbon 500 that operationally couples a power source (e.g., battery source, electrical connection, and the like) with one or more electrical components, such as a circuit board. The switch 502 is activatable via a user pressing axially inward on the thermostat device.

The bottom frame 634 includes a slotted aperture 480 through which a distal end 504 of the flex ribbon 500 is inserted. The distal end 504 of the flex ribbon includes a connector that may electrically couple with a circuit board, chip, or other component of the thermostat. The inner surface of the bottom frame 634 may include a recessed track or portion 482 within which a distal portion of the flex ribbon 500 and the distal end 504 of the flex ribbon reside. The bottom frame 634 also includes a plurality of slotted coupling apertures 484 that enable the bottom frame 634 to be operationally attached to the back cover 636 as described in greater detail below.

The back cover 636 includes a plurality of inverted L-shaped bosses or posts 638 that are insertable within the slotted coupling apertures 484 of the bottom frame 634 to couple the two components together. The back cover 636 also includes a recessed portion 637 that is shaped and sized to accommodate the spring 600, the dome switch 502, and a portion of the flex ribbon 500. The recessed portion 637 may allow these components (i.e., the spring 600, the dome switch 502, and a portion of the flex ribbon 500) to be positioned slightly below an upper surface of the back cover 636 as desired. An aperture 639 is positioned about the back cover 636 to accommodate an electrical coupling plug 506 that is disposed on the proximal end of the flex ribbon 500. The aperture 639 allows the electrical coupling plug 506 to extend into an interior rear space of the back cover 636 and couple with the power source of the thermostat in order to provide power to the various electrical components of the thermostat. The electrical coupling plug 506 may securely fasten to the back cover 636 via one or more mechanical fasteners and the like.

The back cover 636 also includes one or more additional recessed portions 635 that are shaped and sized to accommodate one or more anti-rotation links 650. Specifically, FIG. 9A illustrates the back cover 636 including a pair of recesses 635 that accommodate a pair of anti-rotation links 650.

Figure 9B:
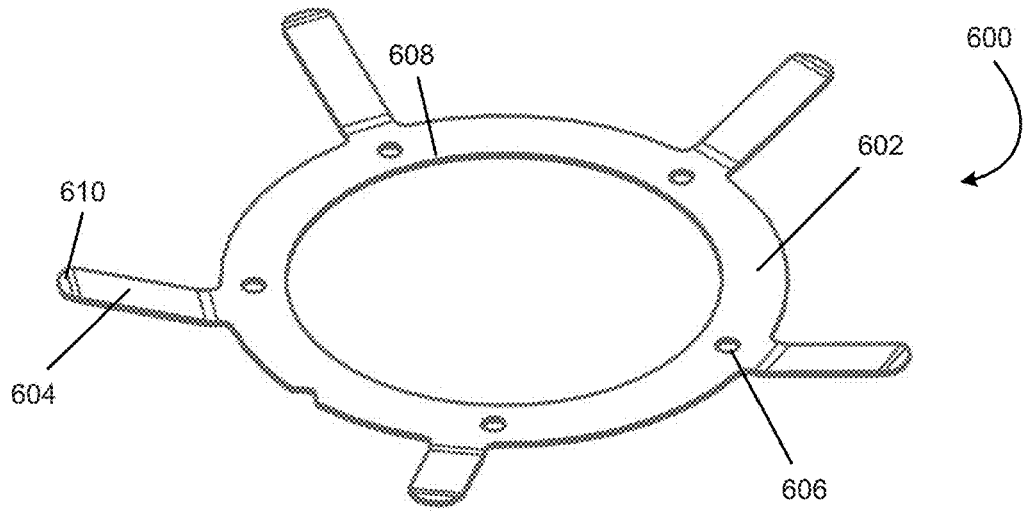
FIG. 9B illustrates an enlarged perspective view of a spring member that may be used to control the movement of the bottom fame relative to the back cover.

FIG. 9B illustrates an enlarged perspective view of an embodiment of the spring 600 that may be used to control the movement of the head unit 540 of the thermostat. The spring 600 illustrated in FIG. 9B includes a central body 602 and one or more fingers 604 that extend radially outward from the central body 602. When assembled with the back cover 636 and bottom frame 634, the central body 602 contacts the back cover 636 and the one or more fingers 604 contact the bottom frame 634. In a specific embodiment, the central body 602 has an annular shape and includes a plurality of fingers 604 that extend both radially outward and axially upward from the annular shaped central body 602. The annular shaped central body includes a central aperture 608 within which the switch 502 is positioned. The plurality of fingers 604 are equally spaced around the circumference of the annular shaped central body 602. In a specific embodiment, the spring 600 includes five fingers 604, although more or fewer fingers may be employed in other embodiments. In some embodiments, the central body 602 includes a plurality of coupling apertures 606 that allow the spring 600 to be quickly and conveniently coupled with the back cover 636. For example, the spring 600 may be attached to the back cover 636 via heat staking, mechanical fastening, or other attachment means. The coupling apertures 606 may be utilized in attaching the spring 600 to the back cover 636. The coupling apertures 606 and/or coupling of the spring 600 to the back cover 636 may prevent translational and/or rotational relative motion of the spring 600 and back cover 636.

A distal end 610 of each of the fingers 604 may be bent so that the distal end 610 forms a small flat surface that is roughly parallel with the central body 602. The bottom frame 634 may be positioned atop and supported by the small flat surface of the distal end 610 of each of the arms 604. The spring 600 axially biases the bottom frame 634 away from the back cover 636.

In one embodiments, the spring 600 is positioned within the thermostat so that the central body 602 is positioned roughly centrally and the radially extend fingers 604 extend radially outward toward the outer periphery of the thermostat device. The positioning of the spring 600 toward the center of the device allows the antennas and sensors to be positioned toward the outer portion of the thermostat without interference from the spring 600, which is commonly made of a metal material. For example, if the spring 600 were positioned near the outer periphery of the thermostat, the spring's metal material may interfere with the performance of the antennas and/or sensors.

Figure 11A:
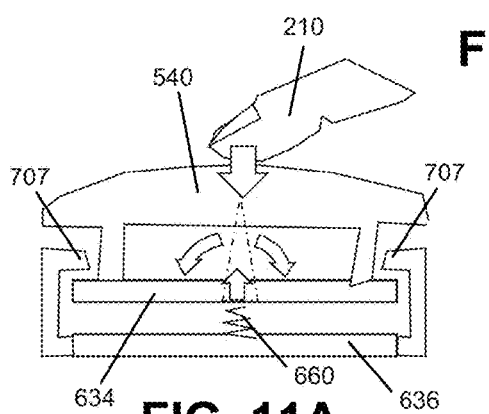
FIGS. 11A-11B illustrate an assembled thermostat that includes a smaller sized spring and a larger sized spring respectively.
Figure 11B:
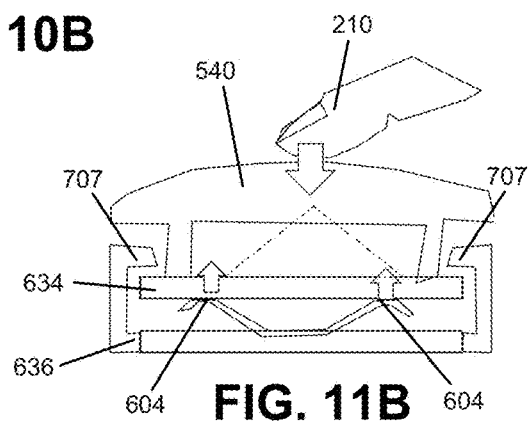

The use of the radially extending arms 604 also helps to stabilize the thermostat device. Specifically, as shown in FIG. 11A, if a radially smaller spring 660 were employed (such as a coil spring) between the bottom frame 634 and the back cover 636, the smaller spring 660 would function more like a fulcrum point about which the head unit 540 pivots when pressed axially inward by a user 210. As shown in FIG. 11B, the radially extending fingers 604 contact the bottom frame 634 in multiple positions that are spaced radially apart. The radially spaced apart multiple points of contact enables the head unit 540 to have a more axial travel when pressed axially inward by a user 210. Stated differently, the force vectors created from the spring 600 are positioned toward the outer edge of the thermostat, which helps stabilize the device. The radial arms or fingers 604 may be extended radially outward to provide increased stability to the thermostat. Typically, however, the radial length of the radial fingers 604 will be shorter than a length that would cause one or more fingers to contact the metallic frame 652. In some embodiments, the radial fingers 604 may have a length up to about 16 mm. It should be realized that some pivoting of the head unit 540 will occur with the use of the radial finger 604, but that pivoting will occur in a more controlled and uniform manner than would occur with the use of a radially smaller sized spring 660, such as a coil spring. The overall result will be a more uniform and pleasing feel for the user.

Figure 10A:
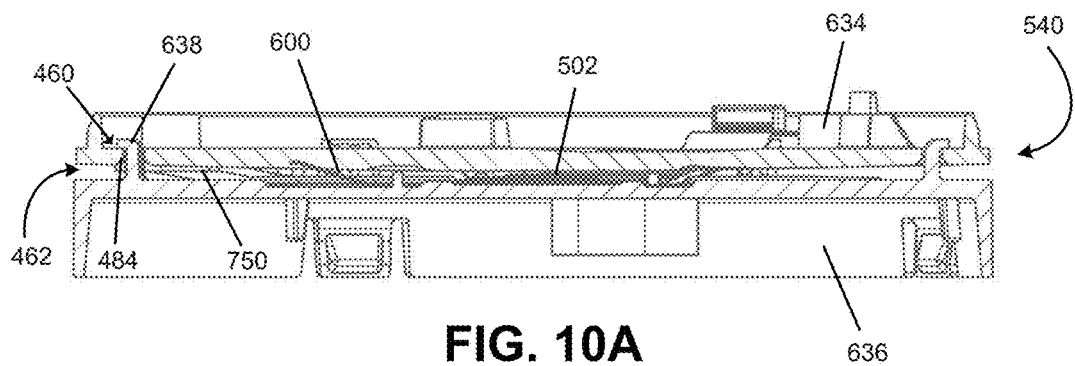
FIGS. 10A-10B illustrate a cross-sectional view and top view of the head unit's bottom frame assembled with the back cover.
Figure 12A:
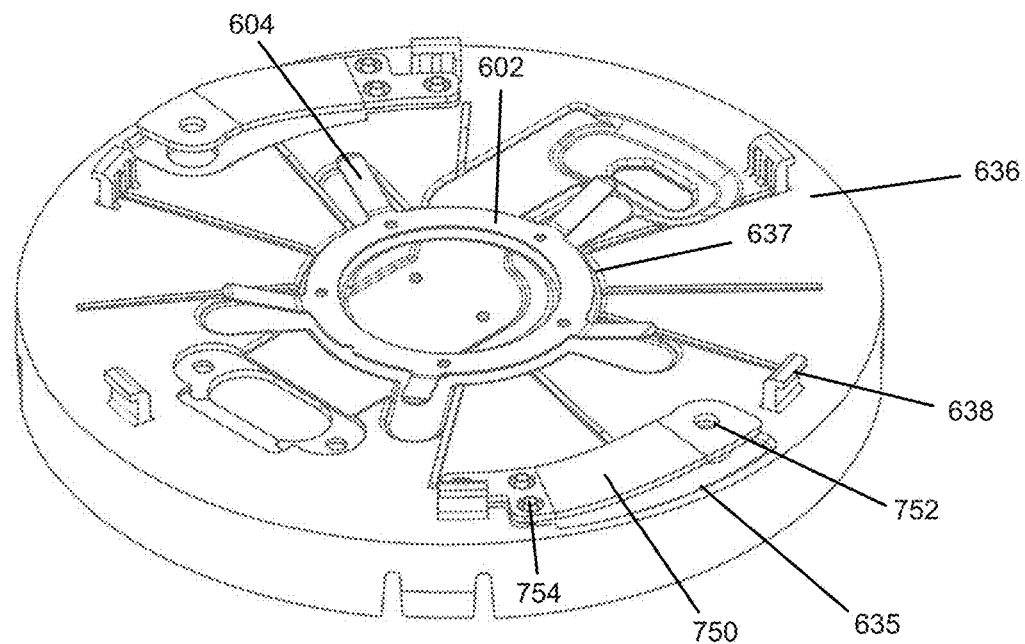
FIG. 12A illustrates an exemplary embodiment of a pair of anti-rotation members that may be used to prevent or minimize rotation of the bottom frame and head unit relative to the back cover.

Radially smaller springs 660 may also be more difficult to capture and contain within a small area, such as between the bottom frame 634 and the back cover 636. In contrast, the spring 600 employed in the embodiments herein may have a much flatter profile that allows the spring 600 to be easily positioned between the bottom frame 634 and back cover 636. For example, as illustrated in FIG. 10A, the flat profile of the spring 600 allows the spring 600 to be easily positioned within a small gap or space 462 between the bottom frame 634 and the back cover 636. In some embodiments, the central body 602 and radial fingers 604 may be made of a leaf spring or sheet metal material that is relatively thin and that is collapsible so as to be substantially flat when compressed. In one embodiment, the spring 600 may have a thickness of between 15 mm and 25 mm. The thickness of the spring 600 may be increased or decreased to provide a desired button force for the thermostat. When the spring 600 is positioned within the recessed portion 637 of the back cover 636, the thin spring 600 may collapse so as to be essentially entirely disposed within the recessed portion 637. Stated differently, the radial fingers 604 may flex so that nearly the entire portion of a respective finger 604 is disposed within the recess or grooves 637 of the back cover 636. The collapsibility of the spring 600 allows the bottom surface of the bottom frame 634 to move into close axial contact with the back cover 636, which allows the bottom surface of the bottom frame 634 to easily contact and activate the switch 502. As shown in FIGS. 9A and 12A, the recessed portion 637 of the back cover 636 may be shaped and sized to accommodate the shape and size of the spring 600. Specifically, the recessed portion 637 may have an annular shaped central recess and a plurality of radially extending recesses that match the configuration of the spring 600. This configuration of the recessed portion 637 allows the spring 600 to collapse and lie essentially flat within the recess portion 637, which allows additional axial travel between the bottom frame 634 and the back cover 636.

As briefly mentioned above, the radially extending fingers 604 of the spring 600 minimize interference between the fingers and one or more components positioned within the gap 462 between the bottom frame 634 and the back cover 636. For example, the fingers 604 are separate from the flex ribbon 500 and thus, do not interfere with and/or contact the flex ribbon 500 as the finger 604 and bottom frame 634 (and/or other components) flex and move axially forward and rearward in response to a user pressing axially inward on the head unit 540. In this manner, the flex ribbon 500 is able to flex or skirt around the fingers 604 and avoid substantial interference therewith. In addition, one or more other components may be positioned between or around the fingers 604 as desired. It has been found that a five finger 604 design as illustrated in FIG. 9B provides a good balance between stability, due to an increased number of arms, and minimal interference with various components. As briefly described above, the radially extending finger 604 design allows the spring force to be directed toward the outside while allowing the spring 600 to be substantially centrally positioned. The allows the head unit 540 and bottom frame 634 to be more stable in relation to the back cover 636.

Although the disclosure focuses mainly on a spring design having radially extending fingers 604, it should be realized that various other springs may be employed as well. For example, various other spring washers may be used to provide a spring force that axially biases the head unit 540 and bottom frame 634 away from the back cover 636. In a specific embodiment, the spring washer may be a wave spring washer (single turn or multi-turn).

The spring 600 is one component of a motion control mechanism or assembly that is disposed roughly between the bottom frame 634 and the back cover 636 to control the relative motion of these two components and thereby control motion of the head unit 540 when a user presses axially inward on the head unit 540. Another component of the motion control mechanism or assembly is a pivot assembly that is configured to provide one or more pivot points about which the head unit 540 pivots when the user presses axially inward on the head unit 540. The pivot assembly operates with the spring 600 to control the motion of the head unit 540 and bottom frame 634 relative to the back cover 636 and provide a more uniform and pleasing "click" feel to the user. Specifically, the pivot assembly is used to control the pivoting of the bottom frame 634 about or relative to the back cover 636.

As one of ordinary skill in the art would understand, some amount or level of force is required to activate the dome switch 502 and, as such, the dome switch 502 provides some level of spring force when contacted by the bottom frame 634. If a pivot assembly were not used, the force imparted by the switch 502 may be sufficient to cause the switch 502 to function as a fulcrum or pivot point about which the bottom frame 634 and head unit 540 pivots, especially when a user is pressing on an outer edge or periphery of the thermostat. This pivoting of the thermostat may result in a significant amount of rotation of the head unit 540 and, in some instances, result in the switch 502 not being activated due to an edge or side of the bottom frame 634 "bottoming out" or contacting the back cover 636. The pivot assembly controls this pivoting or rotation of the bottom frame 634 and head unit 540, and prevents bottoming out of the bottom frame 634, by defining pivot points about which the bottom frame 634 pivots or rotates.

In one embodiment, the pivot assembly includes a plurality of pivot members that are each positioned near and equally spaced around the outer periphery of the thermostat. Each of the pivot members provides or defines a pivot point about which the bottom frame 634 and head unit 540 pivots when the user presses axially inward on the thermostat. The pivot members are formed via contact by the inverted L-shaped bosses or posts 638 of the back cover 636 and the slotted coupling apertures 484 of the bottom frame 634. As illustrated in the cross-section view of FIG. 10A, when the bottom frame 634 is assembled with the back cover 636, a hooked upper end or portion of an inverted L-shaped boss or post 638 is disposed axially above and extends radially over a respective slotted coupling aperture 484. The positioning of the hooked upper ends of the inverted L-shaped bosses or posts 638 over the slotted coupling apertures 484 prevents the bottom frame 634 from becoming decoupled or detached from the back cover 636.

The spring 600 biases the bottom frame 634 axially outward or upward so that an upper surface of the slotted coupling aperture 484 contacts 460 the hooked upper end or portion of the inverted L-shaped boss or post 638. The contact point 460 of one of the slotted coupling apertures 484 and an inverted L-shaped bosses or posts 638, either alone or in combination with another contact point, defines a pivot point about which the bottom frame 634 and head unit 540 pivots when a user presses axially inward on the thermostat device. Specifically, when the user presses axially inward on the head unit 540 in a position that is radially off-set from a central axis of the thermostat (i.e., central axis of the bottom frame 634), the side or edge of the bottom frame 634 adjacent to where the input force is provided will move or rotate downward relative to the back cover 636 while the opposite side or edge of the bottom frame 634 remains in contact with and pivots about the contact point 460 between one or more of the inverted L-shaped bosses or posts 638 and the slotted coupling apertures 484. In this manner, the pivot assembly (i.e., the inverted L-shaped bosses or posts 638 and the slotted coupling apertures 484) defines or provides pivot points about which the bottom frame 634 and head unit 540 pivots or rotates when a user presses axially inward on the head unit 540 in a position that is radially off-set from a central axis of the head unit 540 or thermostat.

It should be realized that each contact point 460 between a respective one of the inverted L-shaped bosses or posts 638 and one of the slotted coupling apertures 484 may define a pivot point that is used in isolation when the bottom frame 634 pivots, or that is used in combination with a pivot point defined by an adjacent inverted L-shaped boss or post 638 and slotted coupling aperture 484. Stated differently, the bottom frame 634 may pivot or rotate about an individual one of the defined pivot points, or may pivot or rotate about two pivot points working in conjunction or combination with each other. When two pivot points are functioning in combination with one another, a pivot axis is essentially created between the two pivot points. In such instances, the bottom frame 634 will pivot or rotate about the defined pivot axis.

Figure 10B:
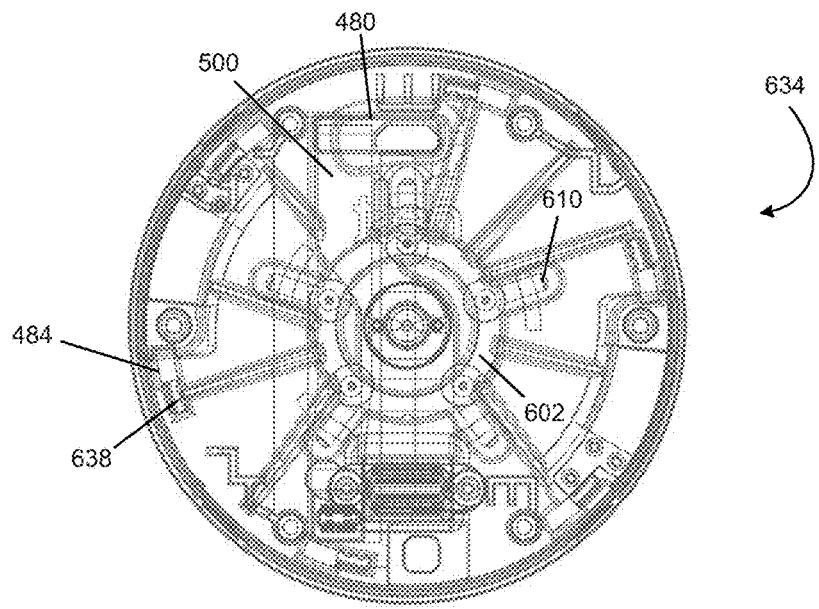

As shown in FIG. 10B, in a specific embodiment, the thermostat includes six pivots points that are each defined by the contact between a respective inverted L-shaped boss or post 638 and a slotted coupling aperture 484. In other embodiments, more or fewer pivots points may be employed as desired. For example, in some instances a lip or flange of the of the back cover 636 may extend radially over a lip or flange of the bottom frame 634. An exemplary lip-flange arrangement (i.e., 707) of the back cover 636 and bottom frame 634 is shown in FIGS. 11A and 11B. If the lip-flange arrangement 707 of the back cover 636 and bottom frame 634 extends around the entire perimeter of the thermostat, a nearly infinite number of pivot points may be created about which the bottom frame 634 and head unit 540 pivot.

FIG. 10B illustrates a top view of the assembled bottom frame 634 and back cover 636. The bottom frame 634 is transparent so that the components positioned under the bottom frame 634 are visible, and specifically the spring 600. The bottom frame 634 rests atop and is supported by the distal end 610 of each of the spring's fingers 604. The flex ribbon 500 is shown positioned along the upper surface of the bottom frame 634 and through the slotted aperture 480. As shown in FIG. 10B, the bottom frame 634 is coupled with the back cover 636 by positioning each of the inverted L-shaped boss or post 638 within a wide portion of the slotted coupling apertures 484 and then rotating the head unit 540 and bottom frame 634 (e.g., clockwise) so that the inverted L-shaped boss or post 638 rotate or move within a narrow portion of the slotted coupling apertures 484. With the inverted L-shaped boss or post 638 positioned in the narrow portion of the slotted coupling apertures 484, the bottom frame 634 is not axially removable from the back cover 636.

Figure 12B:
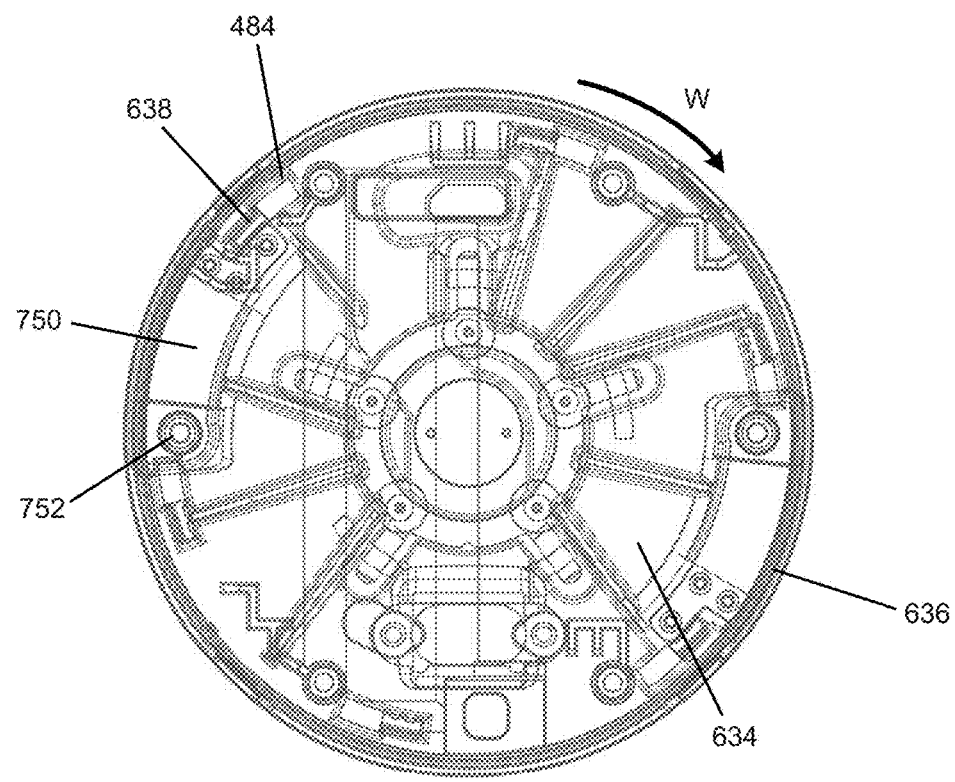
FIG. 12B illustrates a top view of the bottom frame assembled with the back cover with the pair of anti-rotation members disposed between the bottom frame and back cover.

Another component of the motion control mechanism or assembly is an anti-rotation member that prevents or minimizes rotation of the bottom frame 634 and head unit 540 relative to the back cover 636. FIG. 12A illustrates an exemplary embodiment of a pair of anti-rotation members 750. As illustrated in FIG. 12A, a proximal end 754 of the anti-rotation members 750 is coupled or attached to the back cover 636. The proximal end 754 may be attached via heat staking, mechanical fastening, and the like. A main body of the anti-rotation members 750 extends axially upward to a distal end 752 that is configured to attach to the bottom frame 634. The distal end 752 of the anti-rotation members 750 includes a slot or aperture that is configured to couple with the bottom frame 634. Specifically, as shown in FIG. 12B, as the bottom frame 634 is rotated in the direction W to attach the bottom frame 634 to the back cover 636 as described above, a boss or post that extends axially downward from the bottom frame 634 rotates into the slot or aperture on the distal end 752 of the anti-rotation members 750.

With the frame member's boss or post positioned within the slot or aperture of the anti-rotation member's distal end 752, the bottom frame 634 is operationally coupled with the anti-rotation members 750. Specifically, this connection between the bottom frame 634 and the anti-rotation members 750 prevents rotation of the bottom frame 634 by transferring any rotational forces exerted on the bottom frame 634 (e.g., rotational input from the user) to the anti-rotation members 750 and the back cover 636, which is secured via the back plate 542 to the wall of the room or structure within which the thermostat is located.

Figure 14A:
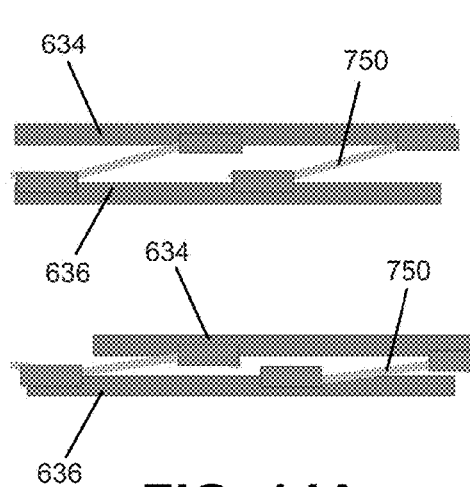
FIGS. 14A-14B illustrate the operation of two different anti-rotation members.

The connection between the bottom frame 634 and the anti-rotation members 750 prevents rotation of the bottom frame 634 in one direction, but allows slight rotation of the bottom frame 634 in the other direction when a user presses axially inward on the thermostat. This aspect of the anti-rotation members 750 is shown in greater detail in FIG. 14A. As illustrated in FIG. 14A, when the bottom frame 634 is moved axially inward, the anti-rotation members 750 deflect axially inward which causes the bottom frame 634 to move slightly laterally relative to the back cover 636. Since two anti-rotation members 750 are used in the instant configuration and are positioned on opposite sides of the thermostat, the slight lateral movement of the frame member results in a slight rotation of the bottom frame 634 and head unit 540 relative to the back cover 636. Stated differently, the anti-rotation members 750 are arranged so that when the user presses axially inward on the device, the anti-rotation members 750 deflect or twist in a way that does not cause binding/buckling. The design of the anti-rotation members 750 to allow a slight rotation of the head unit 540 prevents or minimizes buckling of the anti-rotation members. The rotation of the head unit 540 is very small, commonly about 1 to 3 degrees or less.

Figure 14B:
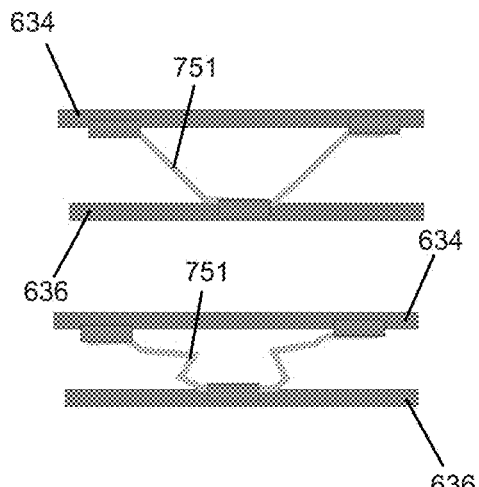

FIG. 14B illustrates a design in which a pair of anti-rotation members 751 are coupled to the back cover 636 and bottom frame 634 in a manner that prevents any rotation of the two components. As illustrated, when the bottom frame 634 is moved axially downward, the anti-rotation member 751 buckles or collapses on itself. Prior to buckling, the anti-rotation member 751 provides a noticeable resistance to axial movement of the bottom frame 634. Because the anti-rotation members 750 of the instant configuration are not prone to this type of buckling, the anti-rotation members 750 provide little resistance to axial movement of the bottom frame 634.

In addition, the anti-rotation members 750 are relatively thin, which also minimizes the resistance to axial movement of the bottom frame 634. In a specific embodiment, the anti-rotation members 750 are made out of thin, wide, flexible plastic materials, which prevent twist and translation without providing an appreciable vertical force. Significant vertical forces that are imparted by the anti-rotation members 750 would make the axial motion or movement of the head unit 540 feel unbalanced, such as by providing a greater force on the side or edge of the device adjacent the anti-rotation members 750 and a lesser force of the side or edge of the device away from the anti-rotation members 750. The use of plastic materials for the anti-rotation members 750 allows the anti-rotation members 750 to overlap with antennas and/or sensors without causing electrical interference.

Figure 13:
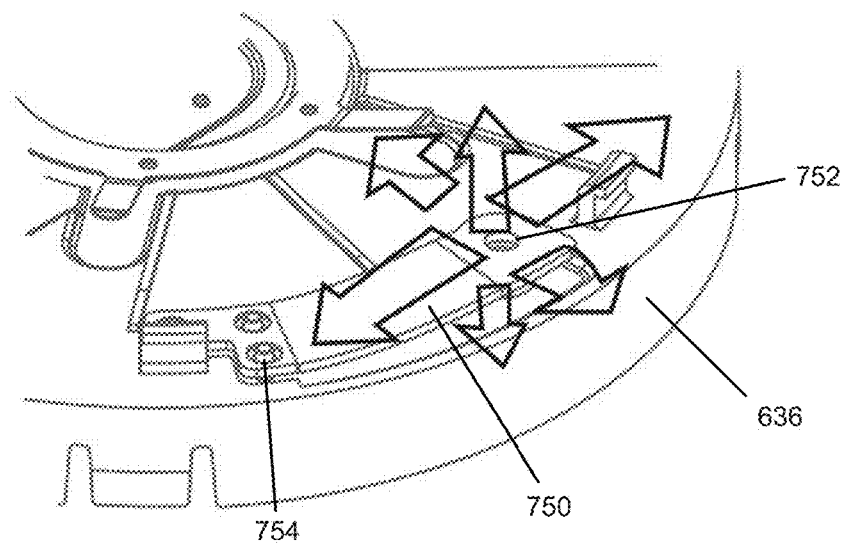
FIG. 13 illustrates an enlarged perspective view of one of the anti-rotation members.

FIG. 13 provides a detailed perspective view of the anti-rotation members 750. As illustrated, the anti-rotation members 750 have a wide and thin profile. The thin profile results in a non-appreciable or insignificant vertical force being imparted to the bottom frame 634 and head unit 540. The wide profile results in the anti-rotation members 750 being very stable in the horizontal directions, thereby preventing flexure of the bottom frame 634 and head unit 540 from side to side and front to back. For example, side to side motion is restricted due to the beam having a very high section modulus. Front to back motion is restricted because the beam is in tension or compression due to such motion. The design of the motion control assembly allows the bottom frame 634 and head unit 540 to move relatively freely relative to the back cover 636 and back plate 542 of the thermostat.

Methods

Figure 15:
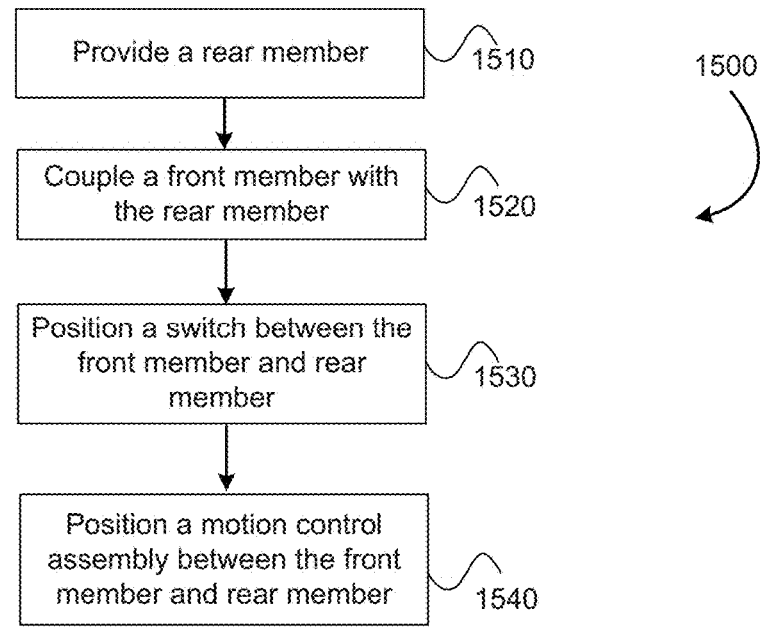
FIG. 15 illustrates a method of configuring a thermostat.

Referring now to FIG. 15, illustrated is a method 1500 of configuring a thermostat. At block 1510, a rear member or back cover is provided. The rear member is configured for mounting on a wall of a building or structure, such as via a back plate 542, to secure the thermostat to the wall. At block 1520, a head unit, front assembly, or bottom frame is coupled with the rear member. Among other components, the head unit or front assembly includes a display (e.g., LCD display) for displaying information to a user. At block 1530, a switch is positioned between the rear member and front member. The switch is activatable via a user axially pressing the head unit/front assembly as described herein. At block 1540, a motion control assembly is positioned between the rear member and the front member. The motion control assembly includes: a pivot assembly that is configured to provide one or more pivot points about which the front member pivots when the user presses axially inward on the head unit/front assembly, and a spring member that contacts the rear member and that also contacts the front member at a plurality of positions to stabilize the front member relative to the rear member. The spring member is configured to axially bias the front member away from the rear member.

In one embodiment, the pivot assembly includes a hook portion (e.g., on the rear member/back cover) and an aperture portion (e.g., on the front member/bottom frame) and coupling the front member with the rear member includes positioning the hook portion through the aperture portion in a manner such that when the user presses axially inward on the head unit/front assembly, the hook portion engages with the aperture portion. In one embodiment, positioning the motion control assembly between the rear member and the front member includes fixedly coupling the spring member with the rear member and contacting the front member with the spring member so that the spring member slidingly engages the front member. In one embodiment, the spring member includes an annular shaped central body and a plurality of fingers that extend radially outward from the central body.

In some embodiments, the method further includes coupling an anti-rotation member with the rear member and the front member. The anti-rotation member is configured to prevent rotation of the front member relative to the rear member. In some embodiments coupling the anti-rotation member with the rear member and front member may include fixedly coupling the anti-rotation member with the rear member and rotating the front member relative to the anti-rotation member to engage a portion of the front member with a distal end of the anti-rotation member.

Figure 16:
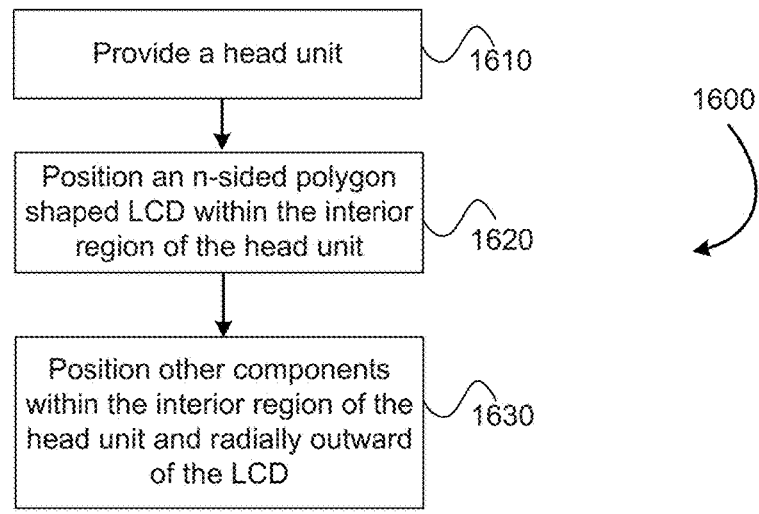
FIG. 16 illustrates a method of configuring a thermostat display.

Referring now to FIG. 16, illustrated is a method 1600 of configuring a thermostat display. At block 1610, a circular head unit having an interior region is provided. At block 1620, a high order n-sided polygonal shaped liquid crystal display (LCD) is positioned within the interior region of the circular head unit so that an active display portion of the high order n-sided polygonal shaped LCD is positioned roughly centrally relative to the circular head unit. The high order n-sided polygonal shaped LCD has a more circular profile than a rectangular shaped LCD. The LCD includes a non-active portion that surrounds the active display portion.

At block 1630, a plurality of additional components are positioned within the interior region of the circular head unit and radially outward of the high order n-sided polygonal shaped LCD.

In some embodiments, the high order n-sided polygonal shaped LCD is positioned within the interior region of the circular head unit so that a central axis of the high order n-sided polygonal shaped LCD is offset from a central axis of the circular head unit. In some embodiments, the plurality of additional components that are positioned within the interior region of the head unit includes one or more antennas that are operationally coupled with a frame of the LCD. In such instances, at least one antenna of the one or more antennas may be positioned so as to extend along two or more sides of the high order n-sided polygonal shaped LCD.

The high order n-sided polygonal shaped LCD may be non-symmetric about at least one plane that intersects a central axis of the high order n-sided polygonal shaped LCD and that is orthogonal to at least one side of the high order n-sided polygonal shaped LCD. The circular head unit may include an outer face that has a convex dome shape. In such instances, the method may also include laminating a material between an inner surface of the outer face and the high order n-sided polygonal shaped LCD. The laminated material may have an index of refraction that is between an index of refraction of the outer face and an index of refraction of the high order n-sided polygonal shaped LCD. In some embodiments, the laminated material may have an index of refraction that is substantially similar, or equivalent to, the outer face with the n-sided polygonal shaped LCD and an inner surface of the outer face.

Rotatable Input Assembly/Mechanism

Figure 17:
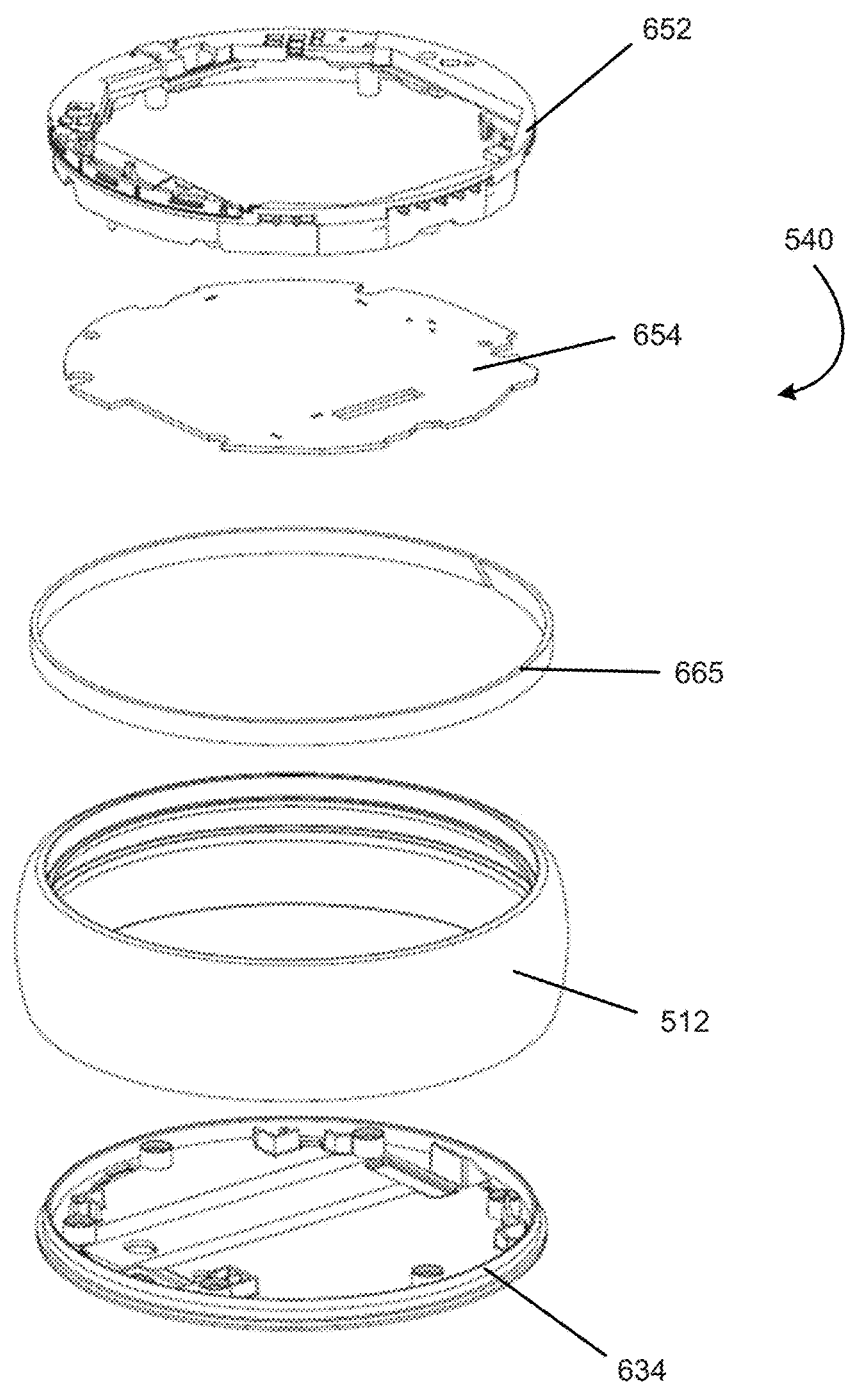
FIG. 17 illustrates an exploded perspective view of a head unit.

Referring now to FIG. 17, illustrated is an exploded view of various components of the head unit 540. In this view, the head unit 540 is shown including the rotatable input component or rotatable ring 512 (hereinafter rotatable ring 512) in addition to some of the other components previously described, such as the frame 652 and bottom frame 634. The display and lens are not shown in FIG. 17, although these components commonly form part of the head unit 540 as described herein. As described above, the head unit 540 operationally couples with a backplate (e.g., backplate 542). The backplate 542 may define a main body that has an interior region housing a plurality of internal components. In other embodiments, the rotatable ring 512 is rotatable coupled with the other components of the head unit 540, such as the bottom frame 634 and frame 652. These components (i.e., the bottom frame 634 and frame 652) may define a main body that has an interior region housing a plurality of internal components, such as PCB 654 and the like.

In any embodiment, a rotatable input component is operationally coupled with the main body. For example, in some embodiments the entire head unit 540 may be coupled with the backplate 542 so that the entire head unit 540 functions as a rotatable input component. In such embodiments, the entire head unit 540, which may or may not include the display and/or lens, may be rotated by a user to allow the user to provide input to the device. In other embodiments, such as the embodiment illustrated in FIG. 17, the rotatable ring 512 functions as the rotatable input component. The rotatable ring 512 may be rotatably coupled with the head unit 540 as desired so that the rotatable ring 512 is rotatable relative thereto. Rotation of the rotatable ring 512 is described in greater detail herein below.

As illustrated in FIG. 17, the rotatable ring 512 may be coupled with the other components of the device so as to define an outer periphery of the device. In some embodiments, the rotatable ring 512 may be made of a single piece of machined stainless steel. In other embodiments, the rotatable ring 512 may be made of two or more pieces and of various materials, such as plastics, metals, or a combination thereof as desired.

FIG. 17 also illustrates a magnetic ring or magnetic strip 665 (hereinafter magnetic strip 665) that functions as one component of a rotation detection system that is configured to sense user rotation of the rotatable ring 512 or other rotatable input component. As described in greater detail below, the magnetic strip 665 is positioned on an inner surface of the rotatable ring 512. The magnetic strip 665 is magnetized so as to have a plurality of alternating north and south magnetic regions. Specifically, the magnetic ring 665 includes striated sections of alternating magnetic polarity that are diagonally positioned around the magnetic ring 665.

A printed circuit board (PCB) 654 is disposed between the frame 652 and the bottom frame 634. The PCB 654 is attached or otherwise coupled with the frame 652 and bottom frame 634 via one or more screws, bolts, pins, adhesive bonding, or mechanical fasteners that are inserted through apertures, or other coupling features, in the frame 652, PCB 654, and bottom frame 634. A sensor (not shown) is positioned on the PCB 654 so as to be adjacent the magnetic strip 665. The sensor may be another component of the rotation detection system. The sensor may be a Hall effect sensor that senses rotation of the magnetic ring 665. The magnetic ring 665 is mounted to the inside of the outer ring 512 using an adhesive such that the outer ring 512 and the magnetic ring 665 are rotated together. The Hall effect sensor senses the alternations between magnetic polarities as the outer ring 512 is rotated. As previously described, the Hall effect sensor can be controlled by a primary processor, such as a higher powered processor, without excessive power drain implications because the primary processor will invariably be awake already when the user is manually turning the outer ring 512 to control the user interface. Rotation of the rotatable ring 512 may be determined based on the sensor sensing polarity changes due to relative movement of the magnetic strip 665. The processor may be another component of the rotation detection system. As described herein, the processor is configured to determine a rotation of the rotatable ring 512 based on the polarity change sensed by the sensor.

Figure 18:
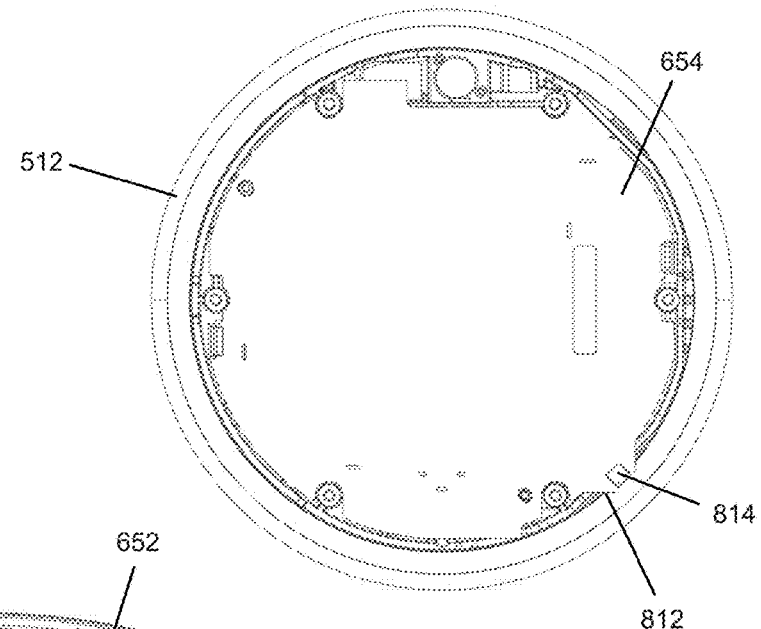
FIG. 18 illustrates a bottom view of the assembled components of the head unit of FIG. 17.

Referring now to FIG. 18, illustrated is a bottom view of the assembled components of the head unit 540. Specifically, FIG. 18 illustrates the PCB 654 positioned within the rotatable ring 512. A corner or edge portion 812 of the PCB 654 extends radially outward and toward the magnetic strip 665. In some embodiments, the portion 812 extends radially outward farther than any other portion or edge of the PCB 654. The sensor 814 is positioned on the radially extended portion 812 of the circuit board. The radially extending portion 812 of the PCB 654 may be sized and shaped slightly larger than the sensor 814 so as to minimize the circuit board material that extends radially outward toward the inner surface of the rotatable ring 512. In some embodiments, the radially extending portion may be triangular in shape and extend radially outward from an outer perimeter of the PCB 654 by between 2-5 mm, and more commonly about 3-4 mm. In a specific embodiment, the radially extending portion may extend radially outward from an outer perimeter of the PCB 654 by about 3.2 mm. This configuration allows the sensor 814 to be positioned radially adjacent the magnetic strip 665 while maintaining a radially small PCB 654.

Although not shown in FIG. 18, in some embodiments a plurality of sensors may be employed. Some or each of the sensors may be coupled with a radially extending portion of the PCB 654 as shown in FIG. 18. The additional sensors may be disposed circumferentially around the PCB 654 as desired, such as being spaced equidistant from one another. The feedback or input received from the plurality of sensors may be used to eliminate noise in the system and/or for various other reasons to ensure that accurate rotation of the rotatable ring 512 (or other rotation input component) is detected and/or calculated.

Figure 19A:
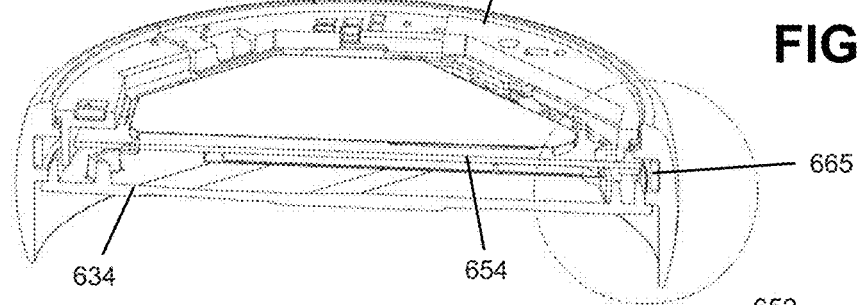
FIGS. 19A-19B illustrate a cross-sectional perspective view and a detailed view, respectively, of the head unit of FIG. 18.

FIG. 19A illustrates a cross-sectional perspective view of the assembled components of FIG. 18. The PCB 654 is illustrated as being sandwiched and coupled between the frame 652 and the bottom frame 634. The magnetic strip 665 is shown as being positioned on an inner surface of the rotatable ring 512. The magnetic strip 665 is positioned on the inner surface of the rotatable ring 512 so as to extends circumferentially around the inner surface of the rotatable ring 512. In other embodiments, the magnetic strip 665 may extend only partially around the inner surface of the rotatable ring 512, or several separate magnetic strips may be positioned on the inner surface of the rotatable ring 512 so that the combination of magnetic strips extend circumferentially around the inner surface of the rotatable ring 512. In any instance, the magnetic strip 665 is commonly coupled with the inner surface of the rotatable ring 512 so that the sensor 814 is able to detect a continuous north or south magnetic pole. As described herein, rotation of the rotatable ring 512 is determined based on the sensor 814 detecting polarity changes in the magnetic strip 665. As such, gaps or spaces in the magnetic poles of the magnetic strip 665 should be minimized or eliminated so that the sensor is continually able to sense a magnetic pole.

The magnetic strip 665 is commonly attached to the inner surface of the rotatable ring 512 so that a gap exists between opposing ends of the magnetic strip 665. As such, the magnetic strip 665 typically does not extend fully around the inner surface of the rotatable ring 512. In some embodiments, the inner surface of the rotatable ring 512 includes a recessed portion within which the magnetic strip 665 is disposed.

Figure 19B:
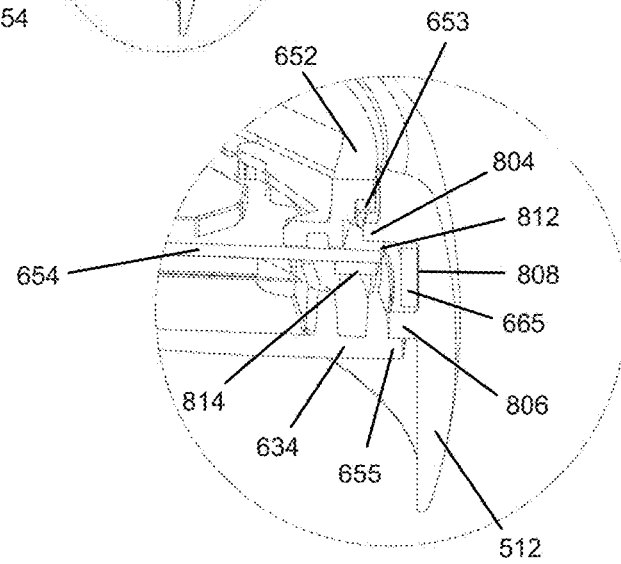

FIG. 19B illustrates a detailed perspective view of one side of the device illustrated in the cross-section view of FIG. 19A. The detailed view illustrates the magnetic strip 665 disposed within a recessed portion 808 of the rotatable ring 512. The magnetic strip 665 may be attached or coupled within the recessed portion 808 via adhesives (e.g., pressure sensitive adhesives), tape, mechanical fasteners, an outward spring force, and the like. The recessed portion 808 of the rotatable ring 512 is defined via an upper lip, flange, or ledge 804 (hereinafter upper flange 804) and a lower lip, flange, or ledge 806 (hereinafter lower flange 806). In some embodiments, the upper flange 804 is rotatably accommodated by, or coupled with, a lower lip or surface 653 of the frame 652. Specifically, the upper flange 804 of the rotatable ring 512 slides and rotates along or about the lower lip 653 of the frame.

Similarly, the lower flange 806 of the rotatable ring 512 is rotatably accommodated by, or coupled with, an upper lip or surface 655 of the bottom frame 634. Specifically, the lower flange 806 of the rotatable ring 512 slides and rotates along or about the upper lip 655 of the bottom frame 634. In this manner, the upper flange 804 and lower flange 806 are rotatably sandwiched between the lower lip 653 of the frame 652 and the upper lip 655 of the bottom frame 634, respectively. The respective surfaces of the rotatable ring 512, the frame 652, and the bottom frame 634 function as bearing surfaces to enable the rotatable ring 512 to rotate and slide. These respective surfaces may also engage the rotatable ring 512 to couple or attach the ring 512 to the device. Some or each of these surfaces may include a material, coating, and the like that reduces friction and enables easy rotation and/or sliding of the surfaces relative to one another. The coating may also serve to add viscous damping to improve/modify the feel of the rotatable ring 512 to the user. As illustrated in FIGS. 19A and 19B, the rotatable ring 512 defines or provides an exterior or outer surface of the head unit 540 and thermostat device.

FIG. 19B also illustrates the sensor 814 attached to the radially extending portion 812 of the PCB 654. The sensor 814 and portion 812 extend radially outward toward the magnetic strip 665. In some embodiments, the radially extending portion 812 and the sensor 814 may extend radially beyond a vertically plane that is defined by an outer edge of the upper flange 804 and/or lower flange 806 as illustrated in FIG. 19B. The remainder of the PCB's outer edge may be disposed radially inward of the vertically plane that is defined by an outer edge of the upper flange 804 and/or lower flange 806. The radially extending portion 812 may be configured so that the sensor 814 is positioned within 1-2 mm from an edge of the sensor 814 to a nearest edge of magnetic strip 665. In a specific embodiment, the radially extending portion 812 may be configured so that the sensor 814 is positioned approximately 1.4 mm from an edge of the sensor 814 to a nearest edge of magnetic strip 665. Positioning the sensor 814 adjacent the magnetic strip 665 in this manner enables the sensor 814 to easily sense polarity changes in the magnetic strip 665 as the magnetic strip and rotatable ring 512 are rotated relative to the sensor 814. The sensor 814 may be positioned on the bottom surface of the PCB 654 or elsewhere as desired. The sensor 814 is typically positioned so as to be roughly centered vertically in relation to the magnetic strip 665. The roughly centered vertically position of the sensor 814 relative to the magnetic strip 665 allows the sensor 814 to sense or experience the strongest magnetic field. It is important to locate the sensor 814 as close to the magnetic strip 665 as possible in order to achieve the highest magnetic field at or in the proximity of the sensor 814 and thereby provide a high signal-to-noise ratio. The higher magnetic fields obtained, the weaker the magnetic material may be.

The sensor 814 is typically stationary within the device and relative to the rotatable ring 512 and magnetic strip 665. In an alternative configuration, the magnetic strip 665 may be stationary and the sensor 814 may be rotated relative to the stationary magnetic strip 665. In such embodiments, the sensor 814 may be coupled with the rotatable ring 512 so as to rotate with the ring and the magnetic strip 665 may be coupled within the head unit 540 (e.g., coupled with the bottom frame 634, PCB 654, and/or frame 652) so as to be stationary relative to the sensor 814 and rotatable ring 512.

In some embodiments, the sensor 814 may be a magnetic field sensor that is based on the anisotropic magneto resistance effect. The sensor 814 may include two parallel Wheatstone bridges, which are arranged at roughly a 45 degree angle relative to one another. The Wheatstone bridges may enclose a sensitive angle of 45 degrees. The rotating magnetic field that is produced via the rotating magnetic strip 665 in a surface parallel to the sensor 814 produces two independent sinusoidal output signals. One of the signals follows a $\cos(2\alpha)$ function and the other signal follows a sin(2α) function, where a is the angle between sensor and field direction. Computation of the sine and cosine output signals allows the relative rotational position of the rotatable ring 512 to be accurately determined. Specifically, output signals are provided to the processor, which is able to compute the rotational position of the rotatable ring 512.

Figure 20A:
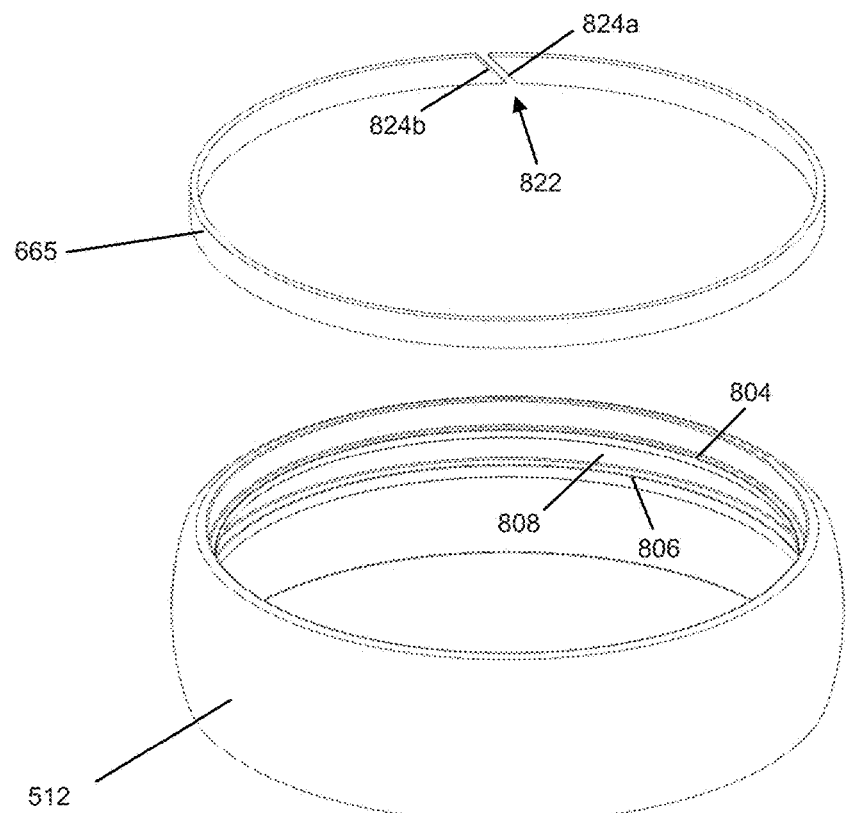
FIGS. 20A-20B illustrate an exploded perspective view and an assembled perspective view, respectively, of a rotatable ring and a magnetic strip.
Figure 20B:
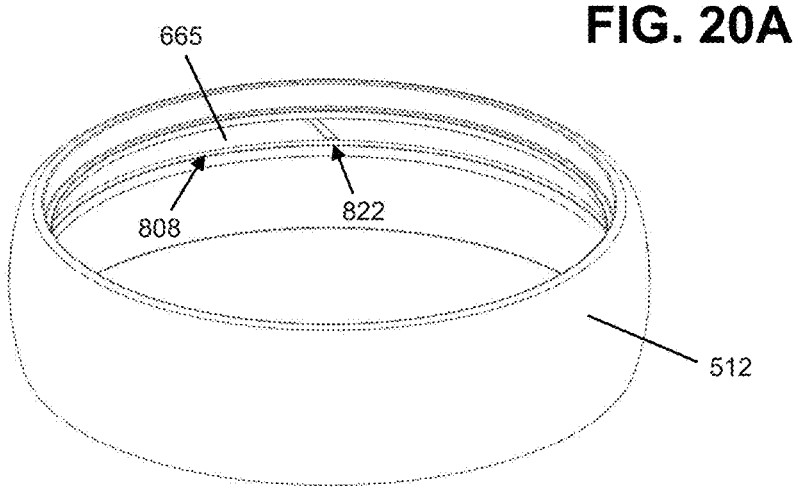

Referring now to FIG. 20A, illustrated is an exploded perspective view of the rotatable ring 512 and the magnetic strip 665. FIG. 20A illustrates the recessed portion 808 of the rotatable ring 512 within which the magnetic strip 665 is positioned. FIG. 20A further illustrates the upper flange 804 and the lower flange 806 that define the recessed portion 808 and that function as bearing surfaces as previously described. The gap 822 of the magnetic strip 665 is also apparent from the illustration of FIG. 20A. FIG. 20B illustrates a perspective view of the assembled rotatable ring 512 and magnetic strip 665. Specifically, the magnetic strip 665 is disposed within the recessed portion 808 of the rotatable ring 512 so as to extend circumferentially around the inner surface of the rotatable ring 512.

When the two components are assembled together, the gap 822 may exist between the opposing ends of the magnetic strip 665. In such instances, the magnetic strip 665 may extend or wrap essentially around the inner surface of the rotatable ring, but not fully around the inner surface. In some embodiments, the opposing ends, 824a and 824b, of the magnetic strip 665 may be angled so that the gap 822 between the opposing ends, 824a and 824b, is also angled. The angled cut of the opposing ends, 824a and 824b, may minimize or eliminate any "dead spots" or gaps in the polarity of the magnetic strip 665. Eliminating or minimizing "dead spots" ensures a consistent and accurate user experience. If care is not taken to minimize "dead spots" or gap, the user could experience a "sluggish", "laggy", or "jumpy" feel when rotating the rotatable ring 512. The overlapping angled magnetic ends of the present design may ensure that the magnetic field is kept more consistent or uniform in comparison with a similar magnetic strip having squared ends. The angled cut of the opposing ends, 824a and 824b, also enables the vertical striations of the magnetic poles to be lined up when the magnetic strip 665 is positioned within the recessed portion 808. Lining up the vertical striations may be important to keep the alternation magnetic pole/fields consistent. The angled interface may assure that a bulk "North" or "South" field remains or exists in that region which the sensor will read. The design wherein the overlapping poles at the angled interface have the same polarity may also ensure that the region will act as a single pole for the sensor. An alternative design wherein a north pole and a south pole are positioned on opposing ends or sides of the gap 822 may effectively create another magnetic region, which could confuse the sensor and/or processor.

The gap 822 allows the magnetic strip 665 to be easily positioned within the recessed portion 808 of the rotatable ring 512. Positioning the magnetic strip 665 within the recessed portion 808 may not be possible, or may be significantly more difficult when a solid ring of magnetic material is employed. The gap 822 also allows a flat magnetized material to be curled or folded and positioned within the recessed portion 808. The magnetized material strip 665 may then spring radially outward and into contact with the inner surface of the rotatable ring 512. In some instances, a pressure sensitive adhesive, or other component or material, may be used to secure the magnet strip 665 within the recessed portion 808. Processing a flat material, such as cutting, applying adhesive, magnetizing, and the like, is significantly simpler than trying to perform the same operations with an annulus of similar material. Accordingly, the gap design of the magnetic strip 665 greatly simplifies manufacture of the device.

In some instances, it may be desirable to minimize the gap 822 between the opposing ends, 824a and 824b, of the magnetic strip 665. For example, the gap 822 may be between about 1.5 mm and 2.5 mm, and more commonly between about 1.4 mm and 2.0 mm. A smaller gap 822 ensures that the opposing ends, 824a and 824b, will function or appear to the sensor as a single magnetic region. If the gap 822 is too large, the signal that is sensed by sensor 814 (i.e. the magnetic flux density in the magneto resistors) at or adjacent the gap 822 may be too small or too weak and thereby confuse the processor and/or sensor 814. The recessed portion 808 may be slightly wider than the magnetic strip 665 to allow the magnetic strip 665 to be easily disposed within the recessed portion 808. In a specific embodiment, the recessed portion 808 may be about 0.7 mm wider than the magnetic strip 808, or approximately 0.35 mm wider on each side.

Figure 21:
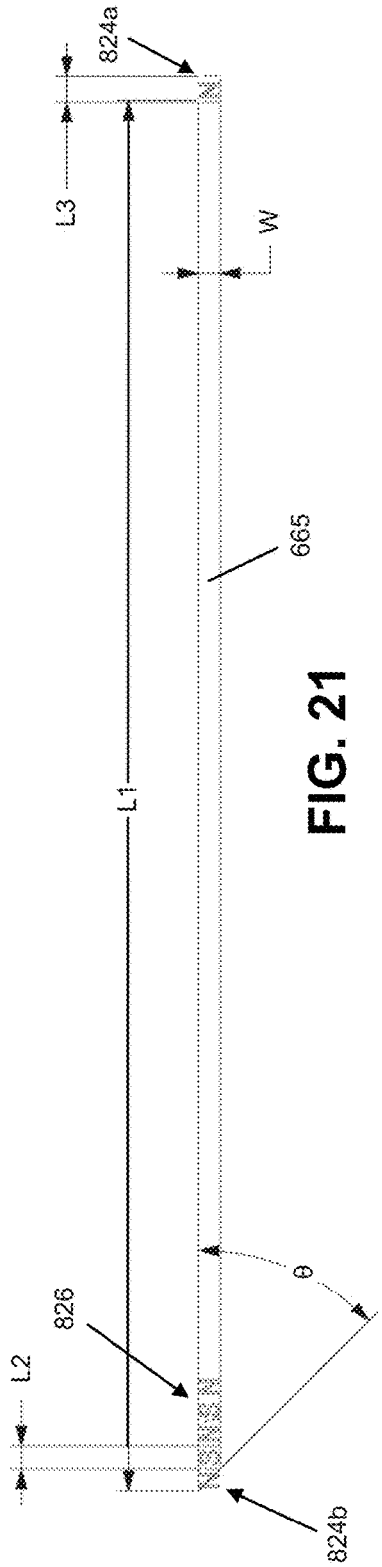
FIG. 21 illustrates a side view of the magnetic strip of FIGS. 20A and 20B.

Referring now to FIG. 21, illustrated is a side view of the magnetic strip 665. According to one embodiment, the magnetic strip 665 has a width W of between about 2 and 10 mm, and more commonly about 4 mm. In a specific embodiment the magnetic strip 665 may have a width W of about 3.8 mm. The magnetic strip 665 may have a length L1 between one end of the strip 665 and the cut at the opposite end of between about 200 and 300 mm, and more commonly about 245 mm. In a specific embodiment the magnetic strip 665 may have a length L1 of about 244 mm. The magnetic strip may also have a thickness of between about 0.5 and 1.5 mm, and more commonly about 1 mm. In a specific embodiment the magnetic strip may have a width of about 1.05 mm.

A length L2 of one of the magnetic poles 826 may be between about 3 and 6 mm, and more commonly about 4 mm. In some embodiments, each of the magnetic pole regions 826 between the opposing angled ends, 824a and 824b, may have essentially the same length L2, which in a specific embodiment may be about 4 mm. The reference to magnetic pole regions 826—i.e., the magnetic pole regions between the opposing angled ends—excludes the angled opposing ends, 824a and 824b, which may have a different length. In a specific embodiment, the magnetic strip 665 may include about 60 magnetic pole regions 826.

The opposing ends, 824a and 824b, may be cut or manufactured so that the magnetic pole on the respective end is roughly cut in half diagonally. The magnetic pole regions 826 typically alternate so that a north magnetic pole is directly adjacent two south magnetic poles and vice versa. The opposing ends, 824a and 824b, are typically magnetized so that each end, 824a and 824b, has the same magnetic polarity. Stated differently, each of the opposing ends, 824a and 824b, is typically either a north magnetic pole or a south magnetic pole. Magnetizing the opposing ends, 824a and 824b, to have the same polarity helps minimize or eliminate issues that may arise when the opposing ends, 824a and 824b, are rotated past the sensor 814. Specifically, because the opposing ends, 824a and 824b, have the same polarity, the sensor 814 may not detect the gap 822 that exists between the opposing ends, 824a and 824b. Rather, the sensor 814 may senses the opposing ends, 824a and 824b, as a solid and continuous magnetic pole region, similar to the other magnetic pole regions 826.

Excluding the angled opposing ends (824a and 824b), each of the magnetic pole regions 826 may have a substantially equivalent surface area defined by L2×W, accounting for minor and/or insignificant deviations in the individual lengths (L2) and widths (W). The angled opposing ends, 824*a* and 824*b*, commonly have a smaller surface area due to the magnetic regions of the opposing ends, 824*a* and 824*b*, being roughly cut in half diagonally. In some embodiments, one of the opposing ends (e.g., 824*a*) may have a surface area that is slight greater than ½ the surface area of a magnetic pole region 826 positioned between the opposing ends, such as in the middle of the magnetic strip 665. Since the width W of the magnetic strip 665 is typically constant, the surface area of the opposing end (e.g., 824*a*) may be increased by lengthening the opposing end (e.g., 824*a*). Stated differently, the opposing end (e.g., 824*a*) may have a length that is slightly longer than L2, which is the length of a typically magnetic pole region 826. For example, the length L3 of the opposing end 824*a* may be between 0.3 and 0.7 mm longer than L2, and more commonly between 0.4 and 0.6 mm loner than L2. In a specific embodiment, the length L3 of one opposing end 824*a* may be about 0.5 mm longer than L2, or between about 4.5 and 4.6 mm. In some embodiments each of the opposing ends, 824*a* and 824*b*, may have a surface area that is greater than ½ of the surface area of the centrally positioned magnetic pole regions 826. In a specific embodiment, one of the opposing ends (e.g., 824*a*) has a greater surface area than the other opposing end (e.g., 824*b*).

Employing a surface area in one or more of the opposing ends, 824*a* and 824*b*, that is slightly larger than ½ the surface area of the other magnetic pole regions 826 helps minimize or eliminate the creation of a magnetic dead spot at the gap 822 between the opposing ends, 824*a* and 824*b*. For example, the slightly larger surface area of the opposing end(s) allows for some level of tolerance in angled cut. In other words, the slightly larger surface area accommodates or compensates for angled cuts that would otherwise be too small and result in a gap 822 that is too large. A gap 822 that is too large may not be detectable by the sensor 814 and disorient or confuse the programmed algorithm, which in some instances may cause the processor to determine that a pole has been skipped and that the rotatable ring 512 is rotating backwards. Stated differently, if the material on one or both of the opposing ends, 824*a* and 824*b*, is cut too much, only a very small amount of material (i.e., a very small triangle of material) may get magnetized as the final pole. The small amount of magnetized material may not be sufficient to provide a magnetic signal that may be detected by the sensor 814.

In some embodiments, the opposing ends, 824*a* and 824*b*, may be formed to have an angle θ of between about 35 and 70 degrees, although an angle of between about 45 and 60 degrees is more common. In a specific embodiment, the angel θ of the opposing ends, 824*a* and 824*b*, is approximately 45 degrees. These angles ensure that the opposing ends, 824*a* and 824*b*, are not square or too shallow so that the material becomes too thin and delicate.

Figure 22:
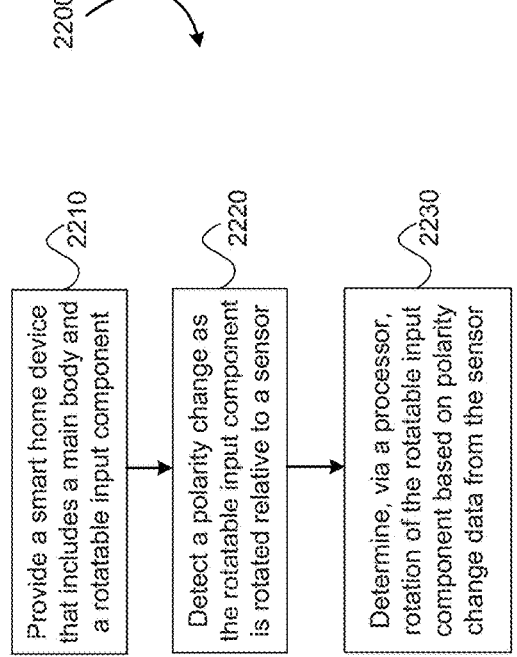
FIG. 22 illustrates a method of sensing rotation of a rotatable input component of a smart home device.

Referring now to FIG. 22, illustrated is a method 2200 of sensing rotation of a rotatable input component of a smart home device. At block 2210, a smart home device is provided. The smart home device includes a main body and a rotatable input component. The main body has an interior region that houses a plurality of internal components including a sensor and a processor. The rotatable input component is rotatably coupled with the main body so as to be rotatable relative thereto. The rotatable input component may be coupled with the main body so as to define an outer periphery of the smart home device. The rotatable input component includes a magnetic component that is positioned on an inner surface of the rotatable input component. The magnetic component is magnetized so as to have a plurality of alternating north and south magnetic regions. In a specific embodiment, the smart home device is a thermostat that is configured to control an HVAC system of a building or structure.

At block 2220, a polarity change is detected via the sensor as the rotatable input component and the magnetic component are rotated relative to the sensor. At block 2230, rotation of the rotatable input component is determined via a processor based on polarity change input that is received from the sensor. In addition to allowing the user to scroll through menus or other options and/or provide user input, the rotatable ring 512 may also be used to wake the device up. Stated differently, rotation of the rotatable ring 512 may cause the thermostat to enter an active state or mode from an inactive or dormant state or mode.

In some embodiments, the magnetic component is positioned on an inner surface of the rotatable input component so as to extend circumferentially around the inner surface of the rotatable input component. A gap may exist between opposing ends of the magnetic component so that the magnetic component does not extend fully around the inner surface of the rotatable input component. In some embodiments, the opposing ends of the magnetic component are angled so that the gap between the opposing ends is also angled. The rotatable input component may include a recessed portion on its inner surface and the magnetic component may be disposed within the recessed portion of the magnetic component.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A thermostat configured for controlling an HVAC system to condition an environment within a building or structure, the thermostat comprising:
   a rear member;
   a front member couplable with the rear member, the front member including a display for displaying information to a user;
   a rotatable ring operationally coupled with the front member and rotatable relative thereto, the rotatable ring being configured to be rotated by a user to enable the user to provide input to the thermostat; and
   a rotation detection system that is configured to sense user rotation of the rotatable ring, the rotation detection system comprising:
      a strip of magnetic material that is coupled with the inner surface of the rotatable ring so as to wrap circumferentially around the inner periphery of the rotatable ring, the strip of magnetic material being magnetized so as to have a plurality of alternating north and south magnetic regions;
      a sensor that is positioned adjacent the strip of magnetic material, the sensor being configured to detect polarity changes in the strip of magnetic material as the strip of magnetic material is rotated relative to the sensor; and
      a processor that is communicatively coupled with the sensor and configured to determine rotation of the rotatable ring based on polarity change input received from the sensor;
      wherein the strip of magnetic material is coupled with the inner surface of the rotatable ring such that a gap exists between opposing ends of the strip of magnetic material.

2. The thermostat of claim 1, wherein the opposing ends of the strip of magnetic material are angled so that the gap between the opposing ends is also angled.

3. The thermostat of claim 2, wherein the opposing ends have the same polarity and one of the opposing ends has a surface area that is greater than ½ of a surface area of a centrally positioned magnetic region.

4. The thermostat of claim 1, wherein the sensor is coupled with a circuit board of the thermostat, the sensor being positioned on a portion of the circuit board that radially extends toward the strip of magnetic material.

5. The thermostat of claim 1, wherein the rotatable ring includes a recessed portion on the inner surface of the rotatable ring, the strip of magnetic material being disposed in the recessed portion.

6. A smart home device comprising:
   a main body having an interior region that houses a plurality of internal components;
   a rotatable input component that is rotatably coupled with the main body so as to be rotatable relative thereto, the rotatable input component being configured to be rotated by a user to enable the user to provide input to the smart home device; and
   a rotation detection system that is configured to sense user rotation of the rotatable input component, the rotation detection system comprising:
      a magnetic component that is positioned on an inner surface of the rotatable input component, the magnetic component being magnetized so as to have a plurality of alternating north and south magnetic regions; and
      a sensor that is positioned within the interior region of the main body so as to be adjacent the magnetic component, the sensor being configured to detect polarity changes as the rotatable input component and magnetic component are rotated relative to the sensor such that the rotation of the rotatable input component is determinable based on the sensor sensing polarity changes due to relative movement of the magnetic component;
      wherein the magnetic component is positioned on the inner surface of the rotatable input component so as to extend circumferentially around the inner surface of the rotatable input component with a gap between opposing ends of the magnetic component such that the magnetic component does not extend fully around the inner surface of the rotatable input component.

7. The smart home device of claim 6, further comprising a processing unit that is positioned within the interior region of the main body and communicatively coupled with the sensor, the processing unit being configured to determine a rotation of the rotatable input component based on the polarity change sensed by the sensor.

8. The smart home device of claim 6, wherein the opposing ends of the magnetic component are angled so that the gap between the opposing ends is also angled.

9. The smart home device of claim 6, wherein each of the alternating north and south magnetic regions between the opposing ends has a roughly equivalent surface area, and wherein a surface area of one of the opposing ends is greater than ½ the surface area of a centrally positioned magnetic region.

10. The smart home device of claim 6, wherein the rotatable input component includes a recessed portion on its inner surface, and wherein the magnetic component is disposed within the recessed portion of the magnetic component.

11. The smart home device of claim 6, wherein the rotatable input component is coupled with the main body so as to define an outer periphery of the smart home device.

12. The smart home devices of claim 6, wherein the smart home device comprises a thermostat.

13. A method of sensing rotation of a rotatable input component of a smart home device comprising:
   providing a smart home device that includes:
      a main body having an interior region that houses a plurality of internal components including a sensor and a processor; and
      a rotatable input component that is rotatably coupled with the main body so as to be rotatable relative thereto, the rotatable input component including a magnetic component that is positioned on an inner surface of the rotatable input component, the magnetic component being magnetized so as to have a plurality of alternating north and south magnetic regions;
   detecting, via the sensor, a polarity change as the rotatable input component and magnetic component are rotated relative to the sensor; and
   determining, via the processor, rotation of the rotatable input component based on polarity change input received from the sensor;
   wherein the magnetic component is positioned on the inner surface of the rotatable input component so as to extend circumferentially around the inner surface of the rotatable input component with a gap between opposing ends of the magnetic component such that the magnetic component does not extend fully around the inner surface of the rotatable input component.

14. The method of claim 13, wherein the opposing ends of the magnetic component are angled so that the gap between the opposing ends is also angled.

15. The method of claim 13, wherein the rotatable input component includes a recessed portion on its inner surface, and wherein the magnetic component is disposed within the recessed portion of the rotatable input component.

16. The method of claim 13, wherein the rotatable input component is coupled with the main body so as to define an outer periphery of the smart home device.

17. The method of claim 16, wherein the smart home device comprises a thermostat.

* * * * *